(12) United States Patent
Kanno et al.

(10) Patent No.: US 9,853,457 B2
(45) Date of Patent: Dec. 26, 2017

(54) WIRELESS POWER TRANSMISSION APPARATUS AND WIRELESS POWER TRANSMISSION SYSTEM

(71) Applicant: Panasonic Corporation, Osaka (JP)

(72) Inventors: Hiroshi Kanno, Osaka (JP); Yoshio Yuse, Hyogo (JP); Sumio Hanafusa, Osaka (JP); Atsushi Yamamoto, Kyoto (JP)

(73) Assignee: Panasonic Corporation, Osaka (JP)

( * ) Notice: Subject to any disclaimer, the term of this patent is extended or adjusted under 35 U.S.C. 154(b) by 670 days.

(21) Appl. No.: 14/522,666

(22) Filed: Oct. 24, 2014

(65) Prior Publication Data

US 2015/0115730 A1    Apr. 30, 2015

(30) Foreign Application Priority Data

Oct. 29, 2013   (JP) ................. 2013-224574

(51) Int. Cl.
*H02J 5/00*   (2016.01)
*H02J 7/02*   (2016.01)
(Continued)

(52) U.S. Cl.
CPC ............ *H02J 5/005* (2013.01); *H02J 7/0004* (2013.01); *H02J 7/025* (2013.01); *H02J 17/00* (2013.01);
(Continued)

(58) Field of Classification Search
CPC .......... H02J 5/005; H02J 7/025; H02J 7/0004; H02J 17/00; H02J 7/0013; H01F 38/14; Y02T 10/7055
(Continued)

(56) References Cited

U.S. PATENT DOCUMENTS

| | | | |
|---|---|---|---|
| 2004/0130915 A1 | 7/2004 | Baarman | |
| 2010/0001845 A1* | 1/2010 | Yamashita | H02J 7/025 340/10.4 |

(Continued)

FOREIGN PATENT DOCUMENTS

| | | |
|---|---|---|
| CN | 102439820 | 5/2012 |
| CN | 102474136 | 5/2012 |

(Continued)

OTHER PUBLICATIONS

Extended European Search Report dated May 8, 2015 in European Application No. 14189848.6.

(Continued)

*Primary Examiner* — Daniel Kessie
(74) *Attorney, Agent, or Firm* — Wenderoth, Lind & Ponack, L.L.P.

(57) ABSTRACT

In a case that the at least one transmission antenna is transmitting a high-frequency power to at least a first wireless power reception apparatus and it is detected that at least a second wireless power reception apparatus is newly electromagnetically coupled with at least one transmission antenna, a wireless power transmission apparatus changes one of a frequency or a amplitude of the high-frequency power depending on a voltage value received from each of at least the first and second wireless power reception apparatuses, to regulate the voltage value of each power reception coil included in each of at least the first and second wireless power reception apparatuses to be equal to or lower than an upper limit value of the voltage value, circuit elements included in each of the first and second wireless power reception apparatuses being durable for the upper limit value.

5 Claims, 18 Drawing Sheets

(51) Int. Cl.
*H02J 7/00* (2006.01)
*H02J 17/00* (2006.01)
*H01F 38/14* (2006.01)

(52) U.S. Cl.
CPC ............ *H01F 38/14* (2013.01); *H02J 7/0013* (2013.01); *Y02T 10/7055* (2013.01)

(58) Field of Classification Search
USPC ........................................................ 307/104
See application file for complete search history.

(56) References Cited

U.S. PATENT DOCUMENTS

| | | | | |
|---|---|---|---|---|
| 2010/0270970 | A1* | 10/2010 | Toya | H02J 7/0027 320/108 |
| 2010/0315039 | A1* | 12/2010 | Terao | H01F 38/14 320/108 |
| 2011/0037322 | A1 | 2/2011 | Kanno | |
| 2011/0266882 | A1 | 11/2011 | Yamamoto et al. | |
| 2012/0043931 | A1* | 2/2012 | Terao | H02J 7/025 320/108 |
| 2012/0056485 | A1* | 3/2012 | Haruyama | H02J 5/005 307/104 |
| 2012/0146580 | A1* | 6/2012 | Kitamura | H01F 38/14 320/108 |
| 2012/0323423 | A1* | 12/2012 | Nakamura | B60L 11/123 701/22 |
| 2013/0099585 | A1 | 4/2013 | Von Novak et al. | |
| 2013/0207468 | A1* | 8/2013 | Wu | H02M 3/33576 307/31 |
| 2014/0070765 | A1* | 3/2014 | Hasegawa | H01M 10/46 320/108 |
| 2014/0091641 | A1* | 4/2014 | Ichikawa | B60L 11/182 307/104 |

FOREIGN PATENT DOCUMENTS

| | | |
|---|---|---|
| EP | 2 367 263 | 9/2011 |
| EP | 2 555 376 | 2/2013 |
| EP | 2 569 870 | 1/2015 |
| JP | 2010-016985 | 1/2010 |
| WO | 2011/143547 | 11/2011 |
| WO | 2012/081519 | 6/2012 |
| WO | 2012/164744 | 12/2012 |

OTHER PUBLICATIONS

English translation of Search Report dated Mar. 25, 2016 in Chinese Application No. 201410584704.8.
Office Action dated Mar. 3, 2016 in European Application No. 14 189 848.6.

* cited by examiner 24a-1

24b-1

24c-1

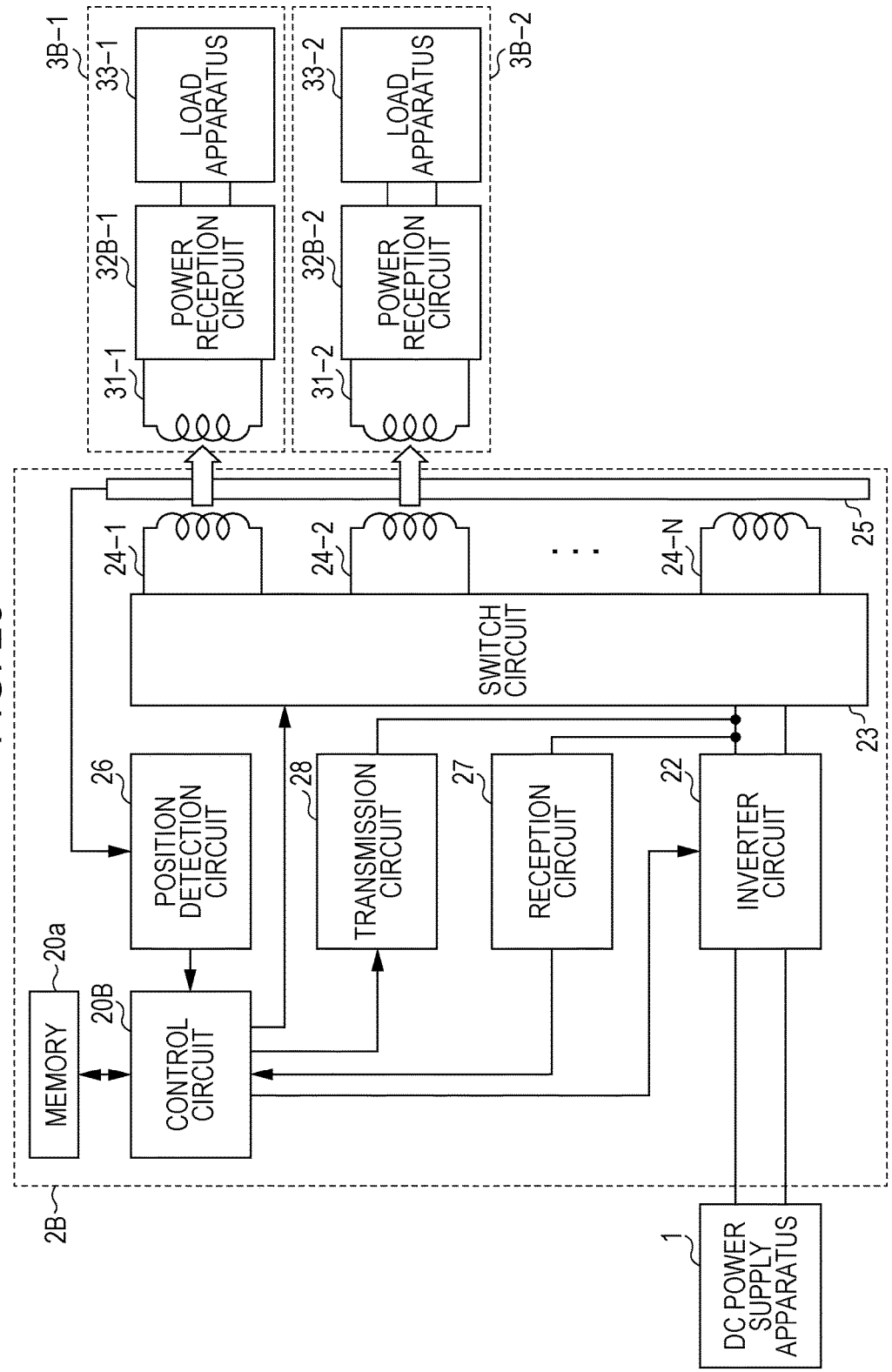

WIRELESS POWER TRANSMISSION APPARATUS AND WIRELESS POWER TRANSMISSION SYSTEM

BACKGROUND

1. Technical Field

The present disclosure is related to a wireless power transmission apparatus and a wireless power transmission system including the wireless power transmission apparatus contactlessly transmitting electric power by using electromagnetic induction between a transmission coil and a power reception coil.

2. Description of the Related Art

In recent years, a portable telephone apparatus and other various kinds of mobile devices have become popular. In such mobile devices, an improvement in function and performance has been made and it has become possible to treat a wide variety of contents, and accordingly the mobile devices need increasingly large power consumption. In a mobile device that operates with a battery with a predetermined capacity, if the power consumption thereof increases, the allowed operation time thereof decreases. A wireless power transmission system is attracting much attention as a technique to compensate for the above-described limitation on the capacity of the battery. In the wireless power transmission system, electric power is transmitted contactlessly from a wireless power transmission apparatus to a wireless power reception apparatus by using electromagnetic induction between a transmission coil of the wireless power transmission apparatus and a power reception coil of the wireless power reception apparatus. In particular, a wireless power transmission system using a resonant transmission coil and a resonant power reception coil (resonant magnetic coupling) is capable of maintaining a high transmission efficiency even when there is some deviation in relative position between the transmission coil and the power reception coil, and thus this type of wireless power transmission system is expected to be used in various applications.

Descriptions on related techniques may be found, for example, Japanese Unexamined Patent Application Publication No. 2010-016985, International Publication No. 2012/081519, and International Publication No. 2012/164744.

SUMMARY

In publications of Japanese Unexamined Patent Application Publication No. 2010-016985, International Publication No. 2012/081519, and International Publication No. 2012/164744, disclosed is a wireless power transmission system in which one wireless power transmission apparatus having a transmission coil transmits electric power to one wireless power reception apparatus having a power reception coil.

In contrast, an aspect of the present disclosure provides a wireless power transmission apparatus and a wireless power transmission system capable of supplying electric power from one wireless power transmission apparatus to a plurality of wireless power reception apparatuses.

According to an aspect of the present disclosure, in a case that the at least one transmission antenna is transmitting a high-frequency power to at least a first wireless power reception apparatus and it is detected that at least a second wireless power reception apparatus is newly electromagnetically coupled with at least one transmission antenna, a wireless power transmission apparatus changes one of a frequency or a amplitude of the high-frequency power depending on a voltage value received from each of at least the first and second wireless power reception apparatuses, to regulate the voltage value of each power reception coil included in each of at least the first and second wireless power reception apparatuses to be equal to or lower than an upper limit value of the voltage value, circuit elements included in each of the first and second wireless power reception apparatuses being durable for the upper limit value.

A generic or specific aspect of the disclosure may be realized in the form of a system, a method, an integrated circuit, a computer program, or a storage medium, or in the form of an arbitrary combination of a system, an apparatus, a method, an integrated circuit, a computer program, and a storage medium.

According to the aspect of the disclosure, it is possible to supply electric power from one wireless power transmission apparatus to a plurality of wireless power reception apparatuses.

BRIEF DESCRIPTION OF THE DRAWINGS

FIG. 20 is a block diagram illustrating a configuration of the wireless power transmission system according to a modification of the second embodiment.

DETAILED DESCRIPTION

Figure 1:
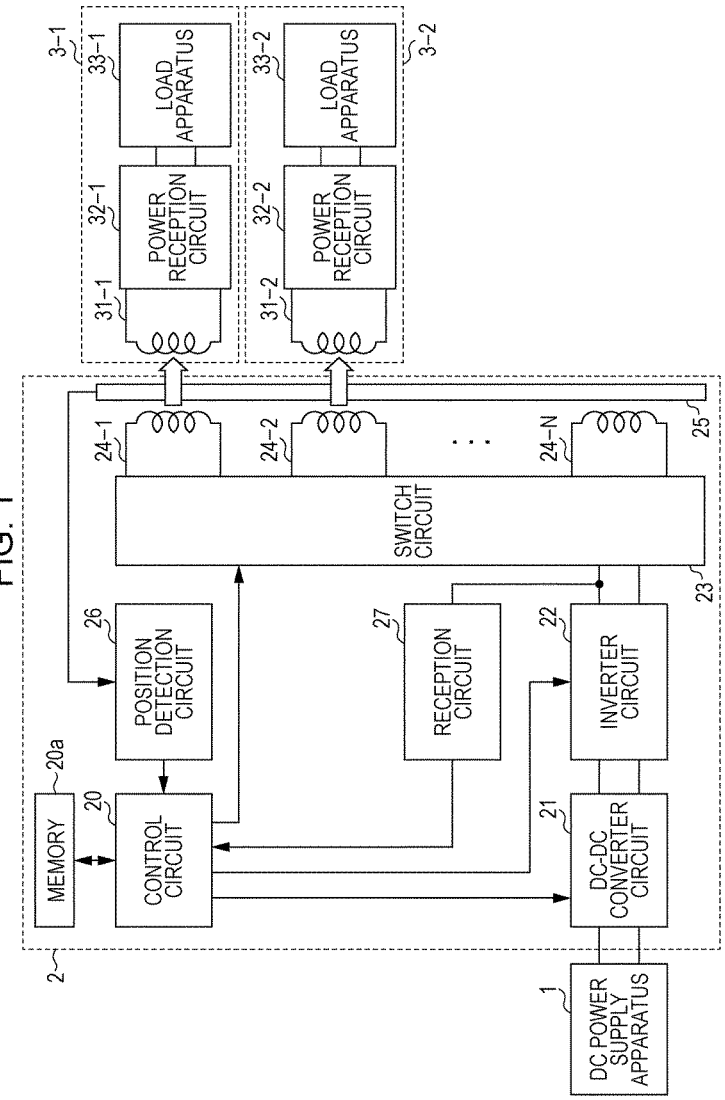
FIG. 1 is a block diagram illustrating a configuration of a wireless power transmission system according to a first embodiment.

Underlying Knowledge Forming Basis of the President Disclosure

The technique disclosed herein is based on the knowledge acquired by analyzing the conventional wireless power transmission system, as described below.

As described above, in the wireless power transmission system disclosed in any of Japanese Unexamined Patent Application Publication No. 2010-016985, International Publication No. 2012/081519, and International Publication No. 2012/164744, electric power is simply transmitted from one wireless power transmission apparatus having a transmission coil to one wireless power reception apparatus having a power reception coil.

In the conventional electromagnetic-induction wireless power transmission system, one wireless power transmission apparatus having one high-frequency power supply source (inverter circuit) is capable of supplying electric power to only one wireless power reception apparatus in any situation. Therefore, for example, in a case where a plurality of wireless power reception apparatuses are put in a power transmission area of one wireless power transmission apparatus, charging is performed sequentially such that charging is performed for one wireless power reception apparatus at a time and, after the charging for this one wireless power reception apparatus is completed, charging for the other wireless power reception apparatus is performed.

In the case of the wireless power transmission system using resonant magnetic coupling, the coupling coefficient between a transmission coil and a power reception coil is small, and thus it is possible to transmit electric power even in a situation where a wireless power reception apparatus is located a greater distance apart from a wireless power transmission apparatus than is allowed in the case of the electromagnetic-induction wireless power transmission system. This makes it possible for one wireless power transmission apparatus to charge a plurality of wireless power reception apparatuses at a time.

However, for example, in a wireless power transmission system in which one wireless power transmission apparatus supplies electric power to a plurality of wireless power reception apparatuses, when a new wireless power reception apparatus other than a wireless power reception apparatus being currently supplied with electric power is added, it is necessary to also supply electric power to the added wireless power reception apparatus.

In a case where all wireless power reception apparatuses including the added wireless power reception apparatus have an equal load characteristic (load impedance), then one method of handling the above-described situation is to increase the electric power by an amount necessary to supply the electric power to all wireless power reception apparatuses while maintaining the same frequency as used in the case where electric power is supplied to only one wireless power reception apparatus, and continue the transmission of electric power.

However, in general, wireless power reception apparatuses may be different in load characteristic (for example, the remaining charge of a rechargeable battery may be different). In this case, depending on the frequency of the high-frequency power being transmitted or the input voltage to the inverter circuit, each of some wireless power reception apparatuses may have too high an output voltage at its power reception coil, which may cause a voltage to become higher than an upper limit of the voltage allowed for a circuit element (a rectifier circuit or the like) in the wireless power reception apparatus connected to the power reception coil.

A cause of the above situation may be as follows.

In the following discussion, for simplicity, it is assumed by way of example that the wireless power transmission system is currently in a situation in which one wireless power transmission apparatus is providing electric power to one wireless power reception apparatus.

Herein following operation conditions are assumed. In a first operation condition, a first wireless power reception apparatus has a load of, for example, 5Ω (a heavy load condition in which the load needs a large current), and requested electric power is 5 W. To satisfy the request for power of 5 W, high-frequency power (hereinafter also referred to simply as electric power) is generated by applying a voltage of 10 V to the inverter circuit of the one wireless power transmission apparatus, and the generated power is transmitted to the first wireless power reception apparatus. In this state, let it be assumed that 5 V is obtained as the output voltage across the power reception coil of the first wireless power reception apparatus.

In a second operation condition, let it be assumed that the first wireless power reception apparatus is replaced with a second wireless power reception apparatus having a load of 100Ω (a light load that needs a small current) and requesting electric power of 0.25 W. In this case, to satisfy the request for power of 0.25 W from the second wireless power reception apparatus, electric power is generated by applying a voltage of 3 V to the inverter circuit of the wireless power transmission apparatus, and the generated power is transmitted to the second wireless power reception apparatus. In this state, let it be also assumed that 5 V is obtained as the output voltage across the power reception coil of the second wireless power reception apparatus.

However, in a case where electric power is supplied to a plurality of wireless power reception apparatuses from one inverter circuit of one wireless power transmission apparatus, the power transmission frequency (hereinafter also referred to simply as a frequency) and the voltage (or the amplitude) of the electric power output to the transmission coil from the inverter circuit are uniquely determined, and it is not allowed to operate the inverter circuit with parameters in terms of the frequency and the voltage having values optimum to achieve optimum power reception conditions for the respective wireless power reception apparatuses.

Therefore, for example, when electric power is being supplied to the first wireless power reception apparatus, if it is started to supply electric power also to a second wireless power reception apparatus, part of the power with a voltage of 10 V transmitted to the first wireless power reception apparatus is divided and supplied to the second wireless power reception apparatus. In a case where power with the voltage of 10 V is transmitted to the second wireless power reception apparatus, the output voltage across the power reception coil of the second wireless power reception apparatus becomes as high as 16.5 V. In this case, the output voltage received at the power reception coil of the second wireless power reception apparatus becomes too high, which may cause a voltage higher than the upper limit to be applied to a circuit element (a rectifier circuit or the like) in the second wireless power reception apparatus connected to the power reception coil. As a result, there is a possibility that a circuit element included in the second wireless power reception apparatus is damaged. The specific value of 16.5 V is obtained as a result of a calculation performed as follows. That is, the value is given by the product of the ratio of the voltage applied to the inverter circuit in the first operation condition to that in the second operation condition and the output voltage of the power reception coil of the second wireless power reception apparatus in the second operation condition (=10 V/3 V×5 V).

For example, when it is tried to determine the optimum frequency and voltage (for example, 3 V) of the electric power to be output to the transmission coil so as to meet the condition for the second wireless power reception apparatus having a smaller load than the load of the first wireless power reception apparatus, if electric power is supplied from one inverter circuit of one wireless power transmission apparatus to a plurality of wireless power reception apparatuses, the transmission of power is possible only in a state in which the frequency and the voltage of the electric power output to the transmission coil from the inverter circuit are fixed at particular values. Therefore, when electric power is transmitted to the second wireless power reception apparatus, the transmission of the electric power is performed under the condition (for example, the voltage is 10 V) determined for the first wireless power reception apparatus. As a result, excessive electric power is provided to the second wireless power reception apparatus having the smaller load than the load of the first wireless power reception apparatus, and the output voltage of the power reception coil becomes high.

As described above, a cause for the output voltage of the power reception coil to become high for the wireless power reception apparatus having the light load is that in the case where power is supplied to a plurality of wireless power reception apparatuses from one inverter circuit of one wireless power transmission apparatus, the transmission of power is possible only in a state in which the frequency and the voltage of the electric power output to the transmission coil from the inverter circuit are fixed at particular values.

One method of handling the problem with the voltage higher than the allowed upper limit applied to the circuit element of the wireless power reception apparatus is to use a circuit element having a higher maximum allowable voltage with a large margin in the wireless power reception apparatus. However, use of the circuit element with a high maximum allowable voltage is high in cost, and thus the total cost becomes high. Therefore, this method is unrealistic.

Thus, there is a need for a wireless power transmission apparatus capable of operating such that in a state in which one wireless power transmission apparatus including one inverter is supplying high-frequency power to a plurality of wireless power reception apparatuses, when a new wireless power reception apparatus is electromagnetically coupled with the wireless power transmission apparatus, the electric power transmission is controlled such that an output voltage of each wireless power reception apparatus does not exceed an upper limit of the voltage allowed for circuit elements in the wireless power reception apparatus. It is desirable to achieve the wireless power transmission system without an increase in cost for circuit elements of the wireless power reception apparatus.

Based on the consideration and analysis described above, the following aspects are disclosed.

In an aspect of the present disclosure, A wireless power transmission apparatus comprises at least one transmission antenna that is capable of being electromagnetically coupled with reception antennas included in each of a plurality of wireless power reception apparatuses, each of the reception antennas including a power reception coil, and that transmits high-frequency power to the plurality of the wireless power reception apparatuses, an inverter circuit that generates the high-frequency power and supply the generated high-frequency power to the at least one transmission antenna, a receiving circuit that receives a voltage value of each power reception coil from each of the plurality of the wireless power reception apparatuses, and a control circuit that controls a transmission condition including a frequency or an amplitude of the high-frequency power supplied from the inverter circuit, depending on the received voltage value, when the at least one transmission antenna is transmitting the high-frequency power to at least a first wireless power reception apparatus and the control circuit detects that at least a second wireless power reception apparatus is newly electromagnetically coupled with the at least one transmission antenna, the control circuit changes one of the frequency or the amplitude of the high-frequency power depending on the voltage value received from each of at least the first and second wireless power reception apparatuses, to regulate the voltage value of each power reception coil included in each of at least the first and second wireless power reception apparatuses to be equal to or lower than an upper limit value of the voltage value, circuit elements included in each of the first and second wireless power reception apparatuses being durable for the upper limit value.

According to the aspect described above, if it is detected that a second wireless power reception apparatus of the plurality of wireless power reception apparatuses is newly electromagnetically coupled with the at least one transmission antenna, the transmission condition in terms of, for example, the frequency, the amplitude, the voltage waveform of the high-frequency power supplied from the inverter circuit, the density of the high-frequency power in a particular period, and/or the like is changed so as to prevent a circuit element included in the at least one wireless power reception apparatus electromagnetically coupled with the at least one transmission antenna from being damaged by an increase in the output voltage of some power reception coil of the plurality of wireless power reception apparatuses.

According to the aspect described above, one of the frequency and the amplitude of the high-frequency power transmitted to the wireless power reception apparatus included in the plurality of wireless power reception apparatuses and electromagnetically coupled with the at least one transmission antenna is changed so as to control the output voltage value received from the at least one wireless power reception apparatus electromagnetically coupled with the at least one transmission antenna such that the output voltage value is equal to or lower than an upper limit of the voltage allowed for the circuit element included in the at least one wireless power reception apparatus. Thus, the output voltage received from the at least one wireless power reception apparatus electromagnetically coupled with the at least one transmission antenna is prevented from becoming greater than the upper limit of the voltage allowed for the circuit element included in the at least one wireless power reception apparatus.

Furthermore, according to the aspect described above, it becomes unnecessary to use a special circuit element having a high maximum allowable voltage for the above-described circuit element of the wireless power reception apparatus, which prevents an increase in cost of the circuit element of the wireless power reception apparatus.

Thus, according to the aspect described above, in the wireless power transmission system using the resonant magnetic coupling, it is possible to supply electric power to a plurality of wireless power reception apparatuses from one wireless power transmission apparatus.

In the aspect described above, for example, the control circuit may be configured such that when the high-frequency power is being transmitted to the first wireless power reception apparatus, if it is detected that a second wireless power reception apparatus is newly electromagnetically coupled with the at least one transmission antenna, the control circuit may change the transmission condition such that the transmission of the high-frequency power to the first wireless power reception apparatus is stopped or such that high-frequency power reduced to be smaller than the high-frequency power being currently transmitted to the first wireless power reception apparatus is transmitted to the first wireless power reception apparatus.

According to the aspect described above, the transmission of the high-frequency power to the first wireless power reception apparatus is stopped or high-frequency power reduced to be smaller than the high-frequency power being currently transmitted to the first wireless power reception apparatus is transmitted to the first wireless power reception apparatus thereby preventing a circuit element included in the at least one wireless power reception apparatus electromagnetically coupled with the at least one transmission antenna from being damaged by an increase in the output voltage of some power reception coil of the plurality of wireless power reception apparatuses.

In the aspect described above, the wireless power transmission apparatus may further include a position detection coil and a position detection circuit configured to detect, using the position detection coil, a relative position of the reception antenna with respect to the transmission antenna, and the detection of the new occurrence of electromagnetic coupling of the second wireless power reception apparatus in the plurality of wireless power reception apparatuses with the at least one transmission antenna may be performed using one of following two methods: a method in which the position detection circuit detects, using the position detection coil, a relative position of the reception antenna with respect to the transmission antenna; or a method in which a change is detected in terms of the output voltage of the power reception coil of any wireless power reception apparatus included in the plurality of wireless power reception apparatuses and electromagnetically coupled with the at least one transmission antenna.

In the aspect described above, for example, the control circuit may change, using the inverter circuit, one of the frequency and the amplitude of the high-frequency power transmitted to the wireless power reception apparatus included in the plurality of wireless power reception apparatuses and electromagnetically coupled with the at least one transmission antenna such that the output voltage value received from the at least one wireless power reception apparatus electromagnetically coupled with the at least one transmission antenna is controlled to be equal to or smaller than an upper limit of the voltage allowed for the circuit element included in the at least one wireless power reception apparatus electromagnetically coupled with the at least one transmission antenna and to be equal to or greater than a minimum allowable voltage above which the wireless power reception apparatus is allowed to operate.

In the aspect described above, for example, the control circuit may be configured such that when it is determined that the second wireless power reception apparatus in the plurality of wireless power reception apparatuses is newly electromagnetically coupled with the at least one transmission antenna, the control circuit determines a frequency of the high-frequency power such that a difference among the output voltage values received using the receiving circuit from the wireless power reception apparatuses electromagnetically coupled with the at least one transmission antenna is within a voltage range corresponding to a difference between the upper limit of the voltage and the minimum allowable voltage above which the wireless power reception apparatus electromagnetically coupled with the at least one transmission antenna is allowed to operate, and the control circuit changes the amplitude of the high-frequency power in a state in which the frequency of the high-frequency power transmitted to the wireless power reception apparatus included in the plurality of wireless power reception apparatuses and electromagnetically coupled with the at least one transmission antenna is maintained at the determined frequency such that the output voltage value received from the wireless power reception apparatus electromagnetically coupled with the at least one transmission antenna is controlled to be equal to or smaller than the upper limit of the voltage and equal to or greater than minimum allowable voltage.

According to the aspect described above, the frequency of the high-frequency power is determined such that the difference among the output voltage values received using the receiving circuit from the wireless power reception apparatuses electromagnetically coupled with the at least one transmission antenna is within the voltage range corresponding to the difference between the upper limit of the voltage and the minimum allowable voltage above which the wireless power reception apparatus electromagnetically coupled with the at least one transmission antenna is allowed to operate. Herein, the value of the voltage range is smaller than the difference between the upper limit of the voltage and the minimum allowable voltage. That is, first, in controlling the output voltage received from the wireless power reception apparatus electromagnetically coupled with the at least one transmission antenna so as to be equal to or lower than the upper limit of the voltage, the frequency of the high-frequency power is determined thereby preparing for making it possible to control the output voltage received from any wireless power reception apparatus electromagnetically coupled with the at least one transmission antenna so as to be equal to or greater than the minimum allowable voltage. In this state, the amplitude of the high-frequency power is changed, and thus it is possible to control the output voltage received from the wireless power reception apparatus electromagnetically coupled with the at least one transmission antenna so as to be equal to or smaller than the upper limit of the voltage and equal to or greater than the minimum allowable voltage.

Thus it is possible to operate all wireless power reception apparatuses electromagnetically coupled with the at least one transmission antenna while preventing the output voltage received from the wireless power reception apparatus electromagnetically coupled with the at least one transmission antenna from being greater than the upper limit of the voltage.

In the aspect described above, for example, the wireless power transmission apparatus may further include a storage apparatus in which data is stored in advance in terms of frequency characteristics of output voltage values received from the respective first and second wireless power reception apparatuses in a state in which the high-frequency power is transmitted to the first and second wireless power reception apparatuses, wherein the control circuit may make the determination such that when it is determined that the second wireless power reception apparatus in the plurality of wireless power reception apparatuses is newly electromagnetically coupled with the at least one transmission antenna, the control circuit may determine the frequency and the amplitude of the high-frequency power transmitted to the first and second wireless power reception apparatuses based on the frequency characteristics stored in the storage apparatus.

According to the aspect described above, the wireless power transmission apparatus further includes a storage apparatus in which data is stored in advance in terms of frequency characteristics of output voltage values received from the respective first and second wireless power reception apparatuses in a state in which the high-frequency power is transmitted to the first and second wireless power reception apparatuses, and the control circuit determines the frequency and the amplitude of the high-frequency power based on the frequency characteristics stored in advance in the storage apparatus.

According to this aspect, it is also possible to determine the frequency and the amplitude such that the output voltage value received from the wireless power reception apparatus electromagnetically coupled with the one transmission antenna is equal to or smaller than the upper limit of the voltage.

That is, based on the frequency characteristics stored in advance in the storage apparatus, a prediction is made as to the frequency and the amplitude of the high-frequency power that allow the output voltage to be equal to or smaller than the upper limit of the voltage. This makes it possible to determine the frequency and the amplitude of the high-frequency power that allow the output voltage to be equal to or smaller than the upper limit of the voltage more quickly than can be determined by searching. As a result, it is possible to quickly start the transmission of the high-frequency power to the wireless power reception apparatus.

In the aspect described above, for example, the wireless power transmission apparatus may further include a storage apparatus, and the control circuit may perform a control such that when the high-frequency power is being transmitted to at least one first wireless power reception apparatus of the plurality of wireless power reception apparatuses, if it is detected that a second wireless power reception apparatus of the plurality of wireless power reception apparatuses is newly electromagnetically coupled with the transmission antenna, parameters associated with the inverter circuit including an output voltage, an output current, and an operating frequency of the inverter circuit are stored in the storage apparatus, the transmission of the high-frequency power to the first wireless power reception apparatus is stopped or high-frequency power reduced to be smaller than the high-frequency power being currently transmitted to the first wireless power reception apparatus is transmitted to the first wireless power reception apparatus, and the frequency and the amplitude of the high-frequency power transmitted simultaneously to the first and second wireless power reception apparatuses are determined based on the parameters stored in the storage apparatus.

In the aspect described above, for example, the control circuit may determine the amplitude of the high-frequency power by controlling at least one of the phase of the high-frequency power generated by the inverter circuit, and the duty ratio of the inverter circuit.

According to the aspect described above, it is possible to temporarily stop the transmission of the high-frequency power or temporarily reduce the amplitude (magnitude) of the high-frequency power being transmitted to a level lower than the amplitude (magnitude) as of when the new wireless power reception apparatus is detected to be coupled with the transmission antenna.

Furthermore, according to the aspect described above, it is possible to reduce the output voltage of each wireless power reception apparatus.

In the aspect described above, for example, the wireless power transmission apparatus may further include a DC-DC converter circuit configured to generate DC electric power with a variable voltage and supply the generated DC electric power to the inverter circuit, and the control circuit may set the amplitude of the high-frequency power by controlling the voltage of the DC electric power.

According to the aspect described above, it is possible to temporarily stop the transmission of the high-frequency power or temporarily reduce the amplitude (magnitude) of the high-frequency power being transmitted to a level lower than the amplitude (magnitude) as of when the new wireless power reception apparatus is detected to be coupled with the transmission antenna.

According to the aspect described above, it is possible to reduce the output voltage of each wireless power reception apparatus by using only the DC-DC converter circuit. The reduction of the output voltage of each wireless power reception apparatus may be performed using a combination of the DC-DC converter circuit and the inverter circuit.

In the aspect described above, the wireless power transmission apparatus may further include a plurality of transmission antenna each having a resonance circuit including a transmission coil, a switching circuit configured to supply high-frequency power generated by the inverter circuit selectively to at least one of transmission antennas, and a detection apparatus configured such that when a reception antenna of one wireless power reception apparatus is newly electromagnetically coupled with at least one of transmission antennas of the transmission antennas, the detection apparatus detects a relative position of the reception antenna with respect to the transmission antennas, wherein based on the relative position of the reception antenna detected by the detection apparatus, the control circuit may control the switching circuit such that high-frequency power is supplied to at least one of the transmission antennas electromagnetically coupled with the reception antenna.

In the aspect described above, the wireless power transmission apparatus may include a transmission antenna.

In the aspect described above, the wireless power reception apparatus may include a rechargeable battery and may charge the rechargeable battery with high-frequency power supplied from the wireless power transmission apparatus.

The aspect described above may be realized as a wireless power transmission system.

According to another aspect of the present disclosure, a wireless power transmission apparatus, in a wireless power transmission system including one wireless power transmission apparatus and a plurality of wireless power reception apparatuses each including a reception antenna having a resonance circuit including a power reception coil, includes at least one transmission antenna having a resonance circuit including a transmission coil and being capable of electromagnetically coupled with a reception antenna of each wireless power reception apparatus, an inverter circuit configured to generate high-frequency power with a variable frequency and a variable amplitude and supply the generated high-frequency power to the transmission antenna, and a control circuit configured to control the inverter circuit, wherein the control circuit may perform a control such that when the high-frequency power is being transmitted to at least one first wireless power reception apparatus of the plurality of wireless power reception apparatuses, if it is detected that a second wireless power reception apparatus of the plurality of wireless power reception apparatuses is newly electromagnetically coupled with the transmission antenna, the transmission of the high-frequency power is stopped temporarily and the frequency and the amplitude of the high-frequency power to be simultaneously transmitted to the first and second wireless power reception apparatuses are set, and then the transmission of the high-frequency power is restarted.

In the aspect described above, for example, the wireless power transmission apparatus may further include a storage apparatus, the control circuit may perform a control such that when the high-frequency power is being transmitted to at least one first wireless power reception apparatus of the plurality of wireless power reception apparatuses, if it is detected that a second wireless power reception apparatus of the plurality of wireless power reception apparatuses is newly electromagnetically coupled with the transmission antenna, parameters associated with the inverter circuit including an output voltage, an output current, and an operating frequency of the inverter circuit are stored in the storage apparatus, the transmission of the high-frequency power is stopped temporarily and the frequency and the amplitude of the high-frequency power to be transmitted simultaneously to the first and second wireless power reception apparatuses are determined based on the parameters stored in the storage apparatus.

In the aspect described above, for example, the wireless power transmission apparatus may further include a storage apparatus in which data is stored in advance in terms of the frequency characteristic of the output voltage of the reception antenna of each wireless power reception apparatus in a state in which the high-frequency power is transmitted simultaneously to the first and second wireless power reception apparatuses, and the control circuit may set the frequency and the amplitude of the high-frequency power to be transmitted simultaneously to the first and second wireless power reception apparatuses based on the frequency characteristics stored in the storage apparatus such that the output voltage of the reception antenna of each wireless power reception apparatus is smaller than a predetermined threshold value.

In the aspect described above, for example, the control circuit may set the amplitude of the high-frequency power by controlling at least one of the phase of the high-frequency power generated by the inverter circuit and the duty ratio of the inverter circuit.

In the aspect described above, for example, the wireless power transmission apparatus may further include a DC electric power supply source configured to generate DC electric power with a variable voltage and supply the generated DC electric power to the inverter circuit, and the control circuit may set the amplitude of the high-frequency power by controlling the voltage of the DC electric power.

In the aspect described above, the wireless power transmission apparatus may include a plurality of transmission antenna each having a resonance circuit including a transmission coil, a switching circuit configured to supply high-frequency power generated by the inverter circuit selectively to at least one of transmission antennas, and a detection apparatus configured such that when a reception antenna of one wireless power reception apparatus is newly electromagnetically coupled with at least one of transmission antennas of the transmission antennas, the detection apparatus detects a relative position of the reception antenna with respect to the transmission antennas, wherein based on the relative position of the reception antenna detected by the detection apparatus, the control circuit may control the switching circuit such that high-frequency power is supplied to at least one of the transmission antennas electromagnetically coupled with the reception antenna.

In the aspect described above, the wireless power transmission apparatus may include a transmission antenna.

In the aspect described above, the wireless power reception apparatus may include a rechargeable battery and may charge the rechargeable battery with high-frequency power supplied from the wireless power transmission apparatus.

The aspect described above may be realized as a wireless power transmission system.

First Embodiment

A wireless power transmission system according to a first embodiment of the present disclosure is described below with reference to drawings.

FIG. 1 is a block diagram illustrating a configuration of the wireless power transmission system according to the first embodiment. The wireless power transmission system illustrated in FIG. 1 includes a wireless power transmission apparatus 2 connected to a DC power supply 1 and a plurality of wireless power reception apparatuses 3-1 and 3-2 which receive electric power from the wireless power transmission apparatus 2.

The wireless power transmission apparatus 2 illustrated in FIG. 1 includes a control circuit 20, a memory 20a, a DC-DC converter circuit 21, an inverter circuit 22, a switching circuit 23, transmission antennas 24-1 to 24-N, a position detection coil 25, a position detection circuit 26, and a receiving circuit 27. The DC-DC converter circuit 21 generates DC electric power with a variable voltage from DC electric power received from the DC power supply 1 and supplies the resultant generated DC electric power to the inverter circuit 22. The inverter circuit 22 generates high-frequency power with a variable frequency and with a variable magnitude (in a case where the frequency of the high-frequency power is constant, the magnitude of the high-frequency power is determined only by the amplitude of the high-frequency power, and thus the magnitude of the high-frequency power may be read as the amplitude of the high-frequency power), and the inverter circuit 22 supplies the generated high-frequency power to the transmission antennas 24-1 to 24-N via the switching circuit 23. The switching circuit 23 supplies the high-frequency power generated by the inverter circuit 22 selectively to at least one of the transmission antennas 24-1 to 24-N. Each of the transmission antennas 24-1 to 24-N has a resonance circuit including a transmission coil, and is capable of electromagnetically coupling with reception antennas 31-1 and 31-2 (described later) of the respective wireless power reception apparatuses 3-1 and 3-2. The position detection coil 25 and the position detection circuit 26 are configured such that when the reception antenna of one wireless power reception apparatus is newly electromagnetically coupled with at least one of the transmission antennas of the transmission antennas 24-1 to 24-N, the position detection coil 25 and the position detection circuit 26 detect a relative position of the reception antenna with respect to the transmission antennas 24-1 to 24-N. The receiving circuit 27 receives the load modulation signal, generated by modifying the power consumption of the wireless power reception apparatuses 3-1 and 3-2 and transmitted from the wireless power reception apparatuses 3-1 and 3-2 to the wireless power transmission apparatus 2, and demodulates the received load modulation signal. The control circuit 20 controls the voltage of the DC electric power generated by the DC-DC converter circuit 21, the frequency and the magnitude of the high-frequency power generated by the inverter circuit 22, and the connection made by the switching circuit 23 between the inverter circuit 22 and the transmission antennas 24-1 to 24-N. The memory 20a stores parameters (power transmission parameters) associated with the operation state of the inverter circuit 22 in a power transmission control process described later with reference to FIG. 11.

The control circuit 20 may control the amplitude (magnitude) of the high-frequency power by changing the voltage of the DC electric power generated by the DC-DC converter circuit 21. The control circuit 20 may control the amplitude (magnitude) of the high-frequency power by controlling at least one of the phase of the high-frequency power generated by the inverter circuit 22 and the duty ratio of the inverter circuit 22.

The wireless power reception apparatus 3-1 illustrated in FIG. 1 includes a reception antenna 31-1, a power reception circuit 32-1, and a load apparatus 33-1. The reception antenna 31-1 includes a resonance circuit including a power reception coil, and is capable of being electromagnetically coupled with at least one transmission antenna 24-1 of the transmission antennas 24-1 to 24-N. When there are a plurality of wireless power reception apparatuses, the transmission antennas 24-1 to 24-N correspond to the reception antennas of the respective wireless power reception apparatuses, for example, in an one-to-one manner. The power reception circuit 32-1 rectifies and smooths the high-frequency power received from the wireless power transmission apparatus 2 via the reception antenna 31-1 and supplies the resultant electric power to the load apparatus 33-1. The load apparatus 33-1 is, for example, a rechargeable battery. In a case where the load apparatus 33-1 is a rechargeable battery, the wireless power reception apparatus 3-1 receives a supply of high-frequency power from the wireless power transmission apparatus 2 and charges the rechargeable battery.

Figure 2:
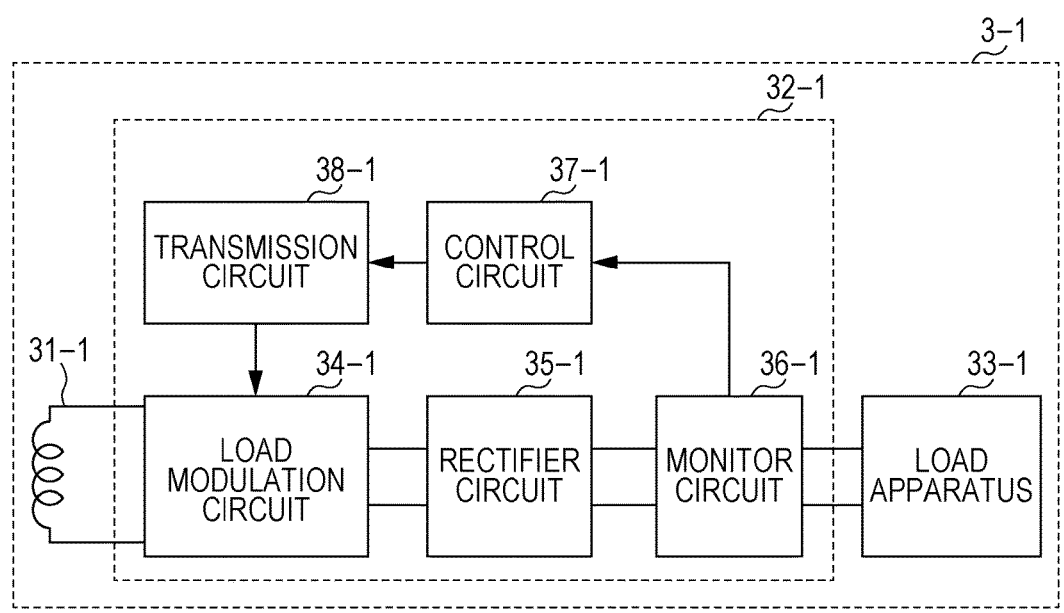
FIG. 2 is a block diagram illustrating an example of a detailed configuration of a wireless power reception apparatus 3-1 in FIG. 1.

FIG. 2 is a block diagram illustrating an example of a detailed configuration of the wireless power reception apparatus 3-1 in FIG. 1. The power reception circuit 32-1 includes a load modulation circuit 34-1, a rectifier circuit 35-1, a monitor circuit 36-1, a control circuit 37-1, and a transmission circuit 38-1. The load modulation circuit 34-1 is connected to the reception antenna 31-1 and generates a load modulation signal by changing power consumption of the wireless power reception apparatus 3-1 under the control of the transmission circuit 38-1. The rectifier circuit 35-1 rectifies and smooths the electric power received from the wireless power transmission apparatus 2 via the reception antenna 31-1 and supplies the resultant electric power to the load apparatus 33-1. The monitor circuit 36-1 monitors power consumption consumed by the load apparatus 33-1. When the monitor circuit 36-1 receives a power request (for increase/reduction of supplied electric power or request for stopping supplied electric power) from the load apparatus 33-1, the monitor circuit 36-1 notifies the control circuit 37-1 of the power request. In response to the notification signal from the monitor circuit 36-1, the control circuit 37-1 controls the transmission circuit 38-1 to generate a load modulation signal using the load modulation circuit 34-1.

The wireless power reception apparatus 3-2 in FIG. 1 is similar in configuration to the wireless power reception apparatus 3-1.

Figure 3:
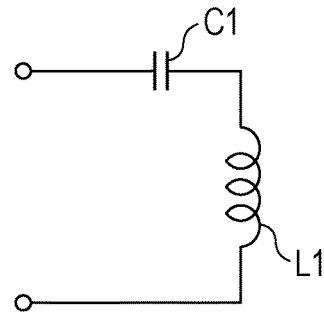
FIG. 3 is a circuit diagram illustrating a transmission antenna 24a-1 according to a first modification of a transmission antenna 24-1 in FIG. 1.
Figure 4:
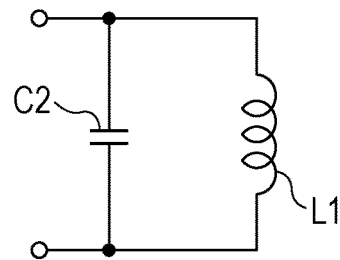
FIG. 4 is a circuit diagram illustrating a transmission antenna 24b-1 according to a second modification of the transmission antenna 24-1 in FIG. 1.
Figure 5:
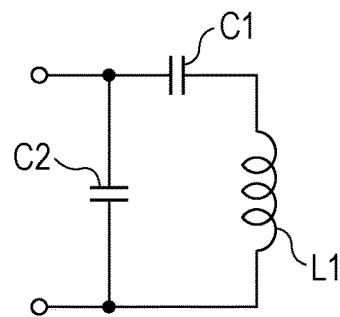
FIG. 5 is a circuit diagram illustrating a transmission antenna 24c-1 according to a third modification of the transmission antenna 24-1 in FIG. 1.

FIG. 3 is a circuit diagram illustrating a transmission antenna 24a-1 according to a first modification of the transmission antenna 24-1 in FIG. 1. The transmission antenna 24a-1 in FIG. 3 includes a series resonance circuit including a transmission coil L1 and a capacitor C1. FIG. 4 is a circuit diagram illustrating a transmission antenna 24b-1 according to a second modification of the transmission antenna 24-1 in FIG. 1. The transmission antenna 24b-1 in FIG. 4 includes a parallel resonance circuit including a transmission coil L1 and a capacitor C2. FIG. 5 is a circuit diagram illustrating a transmission antenna 24c-1 according to a third modification of the transmission antenna 24-1 in FIG. 1. The transmission antenna 24c-1 in FIG. 5 includes a resonance circuit including a capacitor C1 in series to a transmission coil L1 and a capacitor C2 in parallel to the transmission coil L1. Note that examples of medications of the transmission antenna 24-1 illustrated in FIG. 3 to FIG. 5 may be applied to other transmission antennas 24-2 to 24-N.

Furthermore, examples of medications of the transmission antenna 24-1 illustrated in FIG. 3 to FIG. 5 may also be applied to the reception antennas 31-1 and 31-2 of the respective wireless power reception apparatuses 3-1 and 3-2.

The high-frequency power generated by the inverter circuit 22 has a frequency that allows the high-frequency power to pass between the transmission antennas 24-1 to 24-N and the reception antennas 31-1 and 31-2. In general, the transmission antennas 24-1 to 24-N each have a resonance frequency equal to the frequency of the high-frequency power to be passed through. However, the resonance frequency of each of the transmission antennas 24-1 to 24-N may be different from the frequency of the high-frequency power if the high-frequency power is allowed to pass through. Similarly, the reception antennas 31-1 and 31-2 each have a resonance frequency equal to the frequency of the high-frequency power to be passed through. However, the resonance frequency of each of the reception antennas 31-1 and 31-2 may be different from the frequency of the high-frequency power if the high-frequency power is allowed to pass through.

Next, referring to FIGS. 6 to 8, operations of the position detection coil 25 and the position detection circuit 26 in FIG. 1 are described below.

Figure 6:
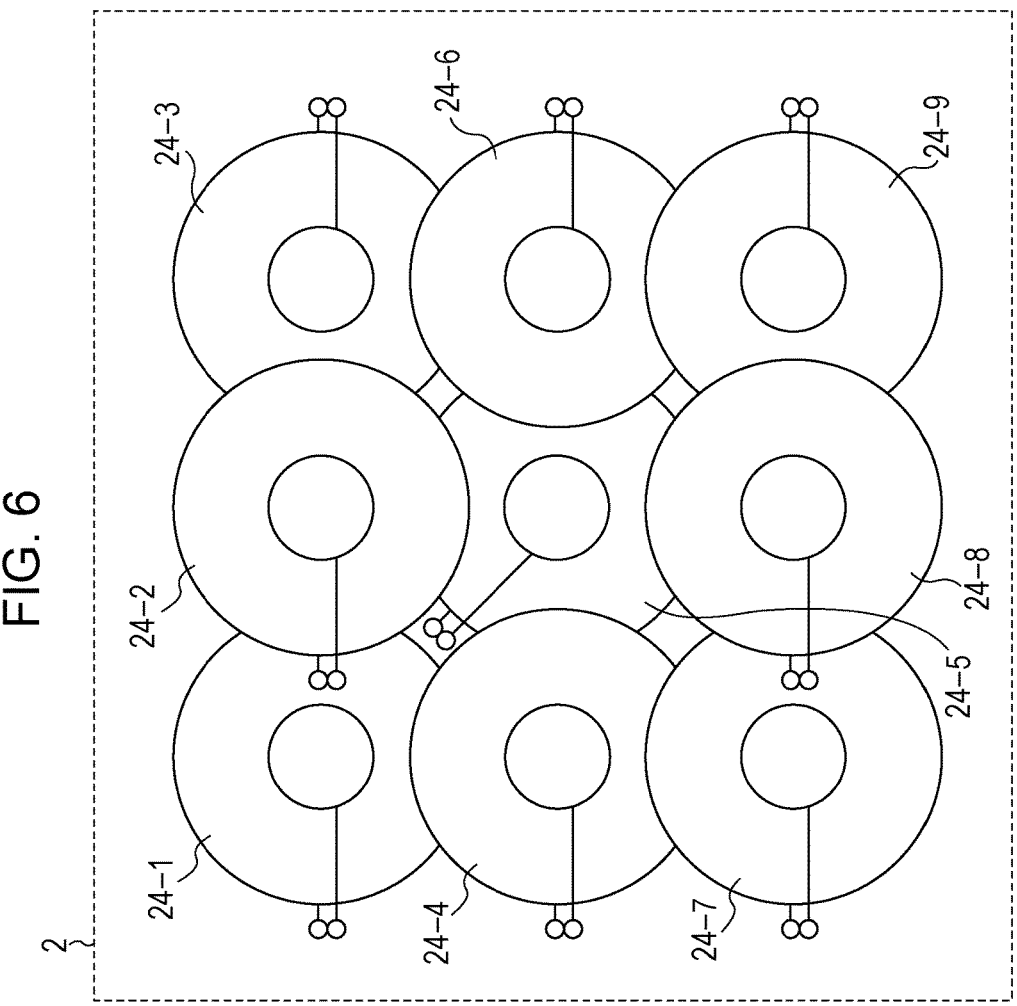
FIG. 6 is a top view illustrating transmission antennas 24-1 to 24-N in FIG. 1 according to the first embodiment.

FIG. 6 is a top view illustrating transmission antennas 24-1 to 24-N in FIG. 1 according to the first embodiment. In the example illustrated in FIG. 6, a plurality of transmission antennas 24-1 to 24-N are disposed at different locations in a two-dimensional plane thereby expanding a range where power transmission is possible. Although in FIG. 6, it is assumed by way of example but not limitation that the transmission coil of each transmission antenna is a circular coil, the transmission coil may be a squire coil, a rectangular coil, a circular coil, an oblong coil, an elliptic coil, or other coils. The transmission coil with a square or rectangular shape is particularly advantageous in that a gap between transmission coils can be smaller than can be obtained by other types of transmission coils and thus it is possible to minimize the area in which electromagnetic coupling with a power reception coil is weak. The transmission coil may be wound in a spiral form or a solenoid form.

When a wireless power reception apparatus (for example, the wireless power reception apparatus 3-1) is newly put on the wireless power transmission apparatus 2, the wireless power transmission apparatus 2 detects the position of the wireless power reception apparatus 3-1 to select a transmission antenna optimum for transmitting electric power to the wireless power reception apparatus 3-1. For this purpose, the position detection circuit 26 transmits a detection pulse to the position detection coil 25 and detects a voltage or a current reflected back from the reception antenna 31-1 of the wireless power reception apparatus 3-1 thereby detecting the reception antenna 31-1. To detect the accurate position of the reception antenna 31-1, the position detection coil 25 is disposed at a location closer to the wireless power reception apparatus 3-1 than the transmission antennas 24-1 to 24-N are located.

Figure 7:
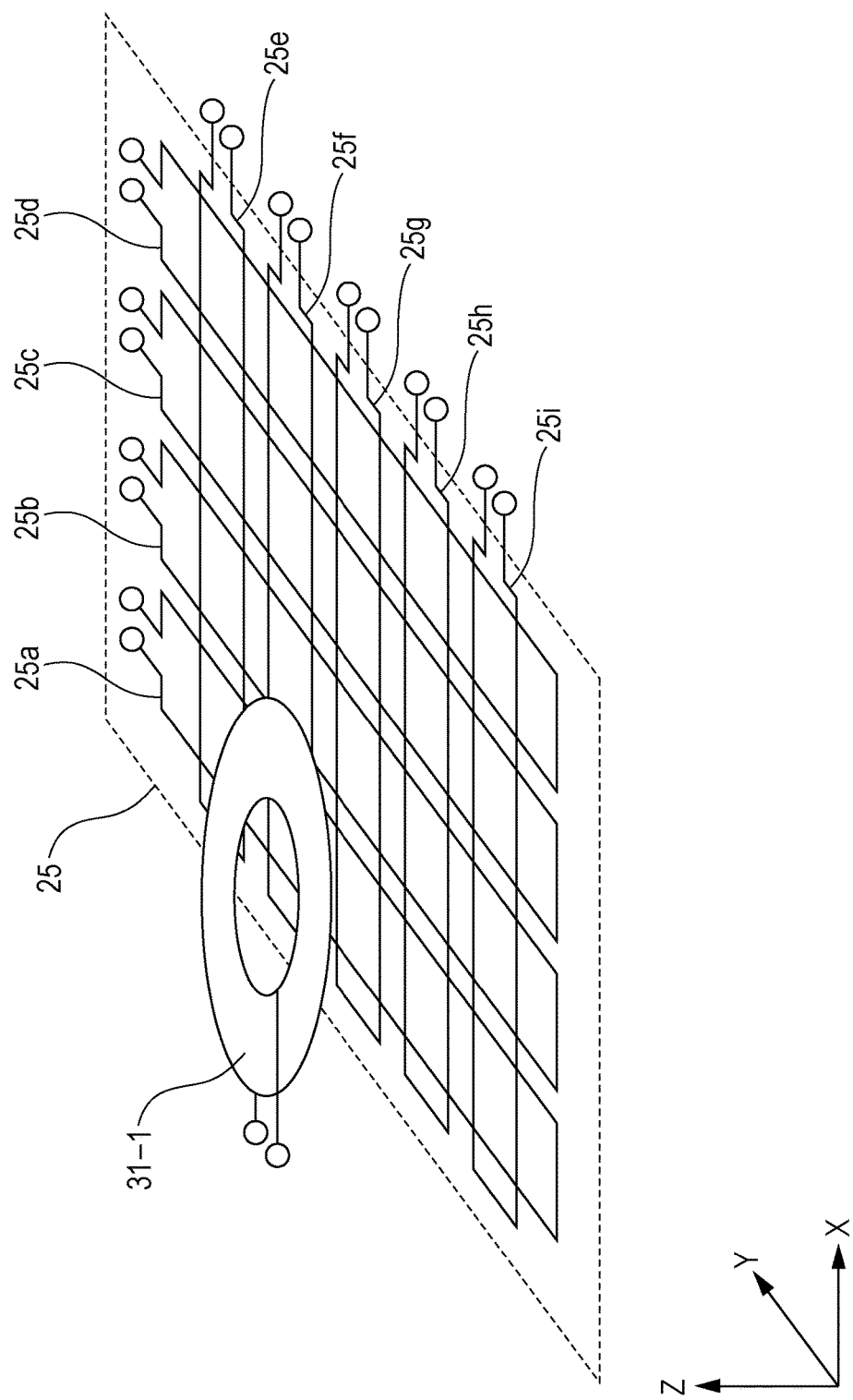
FIG. 7 is a perspective view illustrating an example of a detailed structure of a position detection coil 25 in FIG. 1.

FIG. 7 is a perspective view illustrating an example of a detailed structure of the position detection coil 25 in FIG. 1. The position detection coil 25 includes detection coils 25a to 25d each having a shape longer in the Y direction and detection coils 25e to 25i each having a shape longer in the X direction. The detection coils 25a to 25d are arranged at equal intervals in the X direction, and the detection coils 25e to 25i are arranged at equal intervals in the Y direction.

Figure 8:
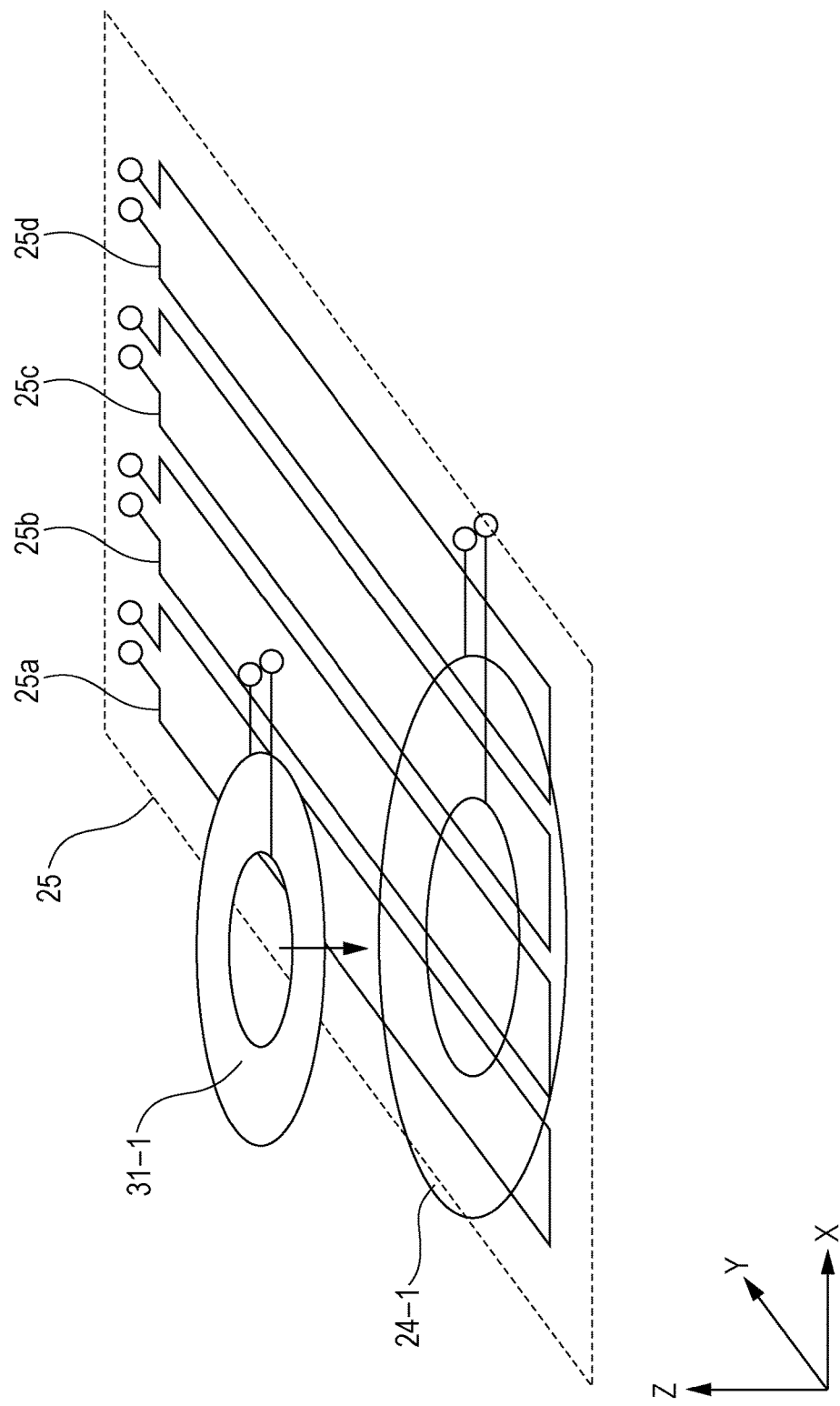
FIG. 8 is a perspective view for use in explaining determination of a position of a reception antenna 31-1 by using the position detection coil 25 in FIG. 7.

FIG. 8 is a perspective view for use in explaining determination of the position of the reception antenna 31-1 by using the position detection coil 25 in FIG. 7. In FIG. 8, for simplification of illustration, the detection coils 25e to 25i in FIG. 7 are omitted. First, the position detection circuit 26 transmits a detection pulse to the detection coil 25a and detects a voltage or a current generated when the detection pulse is reflected back from the reception antenna 31-1, and the position detection circuit 26 stores the strength thereof (hereinafter, referred to as a "reflection strength"). Next, the position detection circuit 26 transmits a detection pulse to the detection coil 25b and, similarly, detects a voltage or a current generated when the detection pulse is reflected back from the reception antenna 31-1, the position detection circuit 26 stores the strength thereof. The position detection circuit 26 performs a similar process by transmitting a detection pulse to the detection coils 25c and 25d. The position detection circuit 26 compares the stored reflection strengths at the respective detection coils 25a to 25d, and determines the X coordinate of the reception antenna 31-1, for example, by employing the coordinate of a detection coil at which a greatest reflection strength is detected as the X coordinate of the reception antenna 31-1. Similarly, the position detection circuit 26 transmits a detection pulse to the detection coils 25e to 25i and determines the Y coordinate of the reception antenna 31-1.

The position detection circuit 26 notifies the control circuit 20 of the detected position of the reception antenna 31-1. Based on the relative position of the reception antenna 31-1 detected by the position detection coil 25 and the position detection circuit 26, the control circuit 20 controls the switching circuit 23 such that high-frequency power is supplied to at least one of transmission antennas electromagnetically coupled with the reception antenna 31-1.

The structure of the position detection coil 25 is not limited to that illustrated in FIG. 7. In the structure illustrated in FIG. 7, it is assumed by way of example but not limitation that four detection coils 25a to 25d are arranged in the X direction, and five detection coils 25e to 25i are arranged in the Y direction. However, the structure may include a combination of a different number of detection coils depending on a range over which to detect a reception antenna. In a case where it is not necessary to determine the Y coordinate of the reception antenna 31-1, the detection coils 25e to 25i may be omitted. Although in the structures illustrated in FIG. 7 and FIG. 8, it is assumed by way of example but not limitation that the detection coils 25a to 25i each have a single turn, each detection coil may have two or more turns. An increase in the number of turns results in an increase in a coupling strength between the detection coil and the reception antenna 31-1, which results in an increase in reflection strength. Although in the structures illustrated in FIG. 7 and FIG. 8, it is assumed by way of example but not limitation that the detection coils 25a to 25i each are a rectangular coil, each detection coil may have a different shape such as a square shape, a circular shape, an oblong shape, an elliptic shape, or other shapes.

To increase the accuracy of the detection of the position, the position detection circuit 26 may determine the Y coordinate of the reception antenna 31-1 based not only on the greatest reflection strength detected at a detection coil but also reflection strengths detected at a plurality of detection coils at nearby locations.

Figure 9:
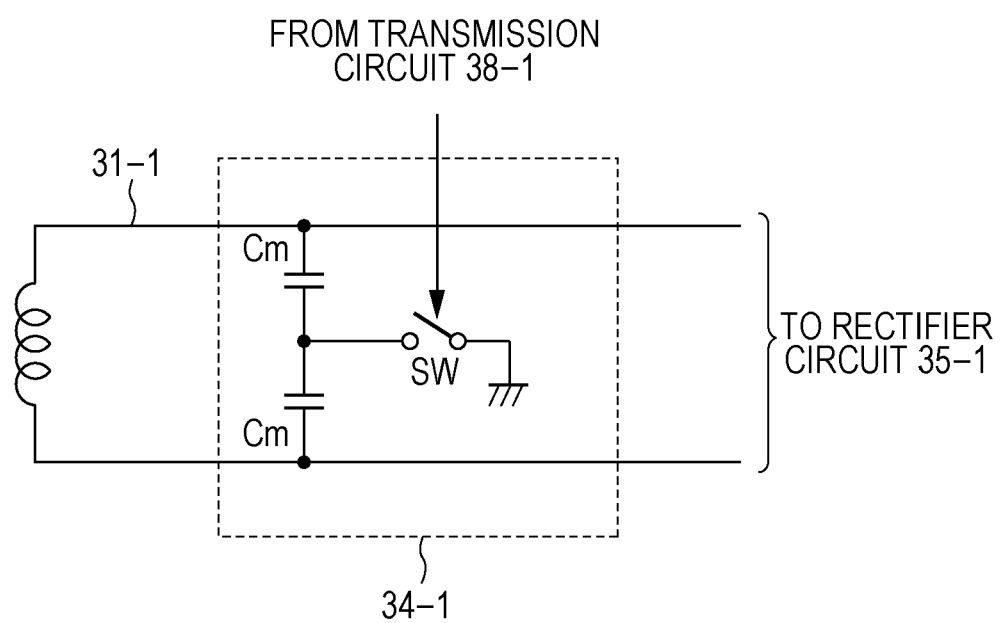
FIG. 9 is a circuit diagram illustrating an example of a detailed configuration of a load modulation circuit 34-1 in FIG. 2.

FIG. 9 is a circuit diagram illustrating an example of a detailed configuration of the load modulation circuit 34-1 in FIG. 2. The load modulation circuit 34-1 includes two capacitors connected in series to each other and the series of the two capacitors is connected in parallel to the power reception coil of the reception antenna 31-1, and a switch SW connected to a node between the two capacitors such that the node between the two capacitors is selectively grounded under the control of the transmission circuit 38-1. For example, the two capacitors have equal capacitance Cm. The capacitance Cm of the two capacitors are sufficiently small (for example, about 100 pF) so that the capacitance Cm does not cause a change to occur in the frequency (for example, a frequency in a 100 kHz band) of a carrier wave of a data signal transmitted from the transmission circuit 38-1. When the switch SW is opened and closed, the amplitude of the carrier wave of the data signal changes, and correspondingly a load modulation signal is generated. Thus, the load modulation circuit 34-1 operates as an amplitude modulation circuit.

Figure 10:
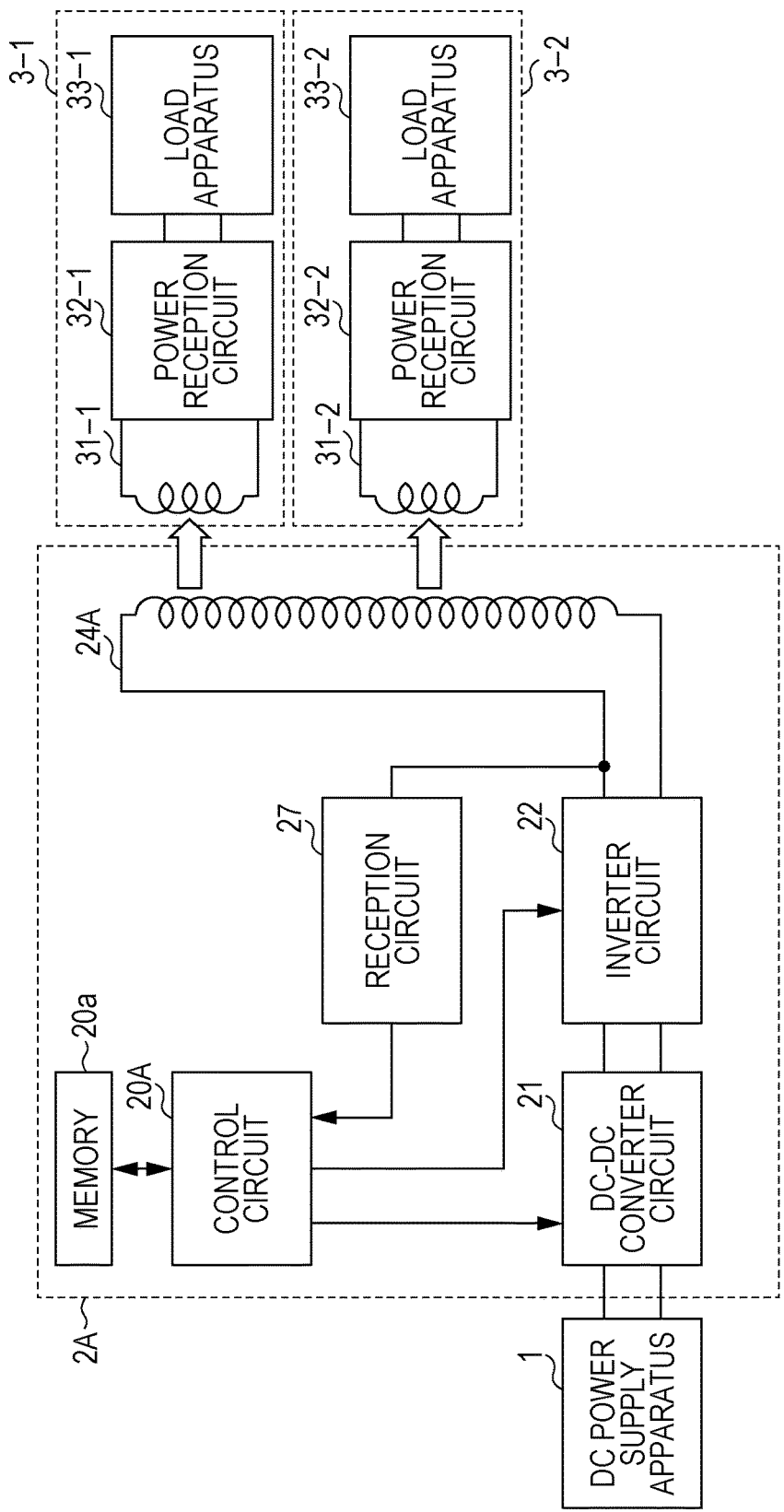
FIG. 10 is a block diagram illustrating a configuration of a wireless power transmission system according to a first modification of the first embodiment.

FIG. 10 is a block diagram illustrating a configuration of a wireless power transmission system according to a first modification of the first embodiment. The wireless power transmission apparatus according to the present modification may include only one transmission antenna instead of a plurality of transmission antennas. More specifically, the wireless power transmission apparatus 2A illustrated in FIG. 10 does not include the switching circuit 23 and the transmission antennas 24-1 to 24-N included in the wireless power transmission apparatus 2 illustrated in FIG. 1 but instead includes one transmission antenna 24A. Furthermore, the wireless power transmission apparatus 2A does not have the position detection coil 25 and the position detection circuit 26 included in the wireless power transmission apparatus 2 illustrated in FIG. 1, and includes a control circuit 20A instead of the control circuit 20 in FIG. 1. The reception antennas 31-1 and 31-2 of the respective wireless power reception apparatuses 3-1 and 3-2 are capable of electromagnetically coupled with the transmission antenna 24A. The transmission antenna 24A may be similar in configuration to the transmission antennas 24-1 to 24-N and 24*a*-1 to 24*c*-1 described above with reference to FIG. 1 and FIGS. 3 to 5, except that the transmission antenna 24A is capable of being electromagnetically coupled with a plurality of reception antennas. When a change occurs in a load of the inverter circuit 22, the control circuit 20A detects that a wireless power reception apparatus is put.

Figure 19:
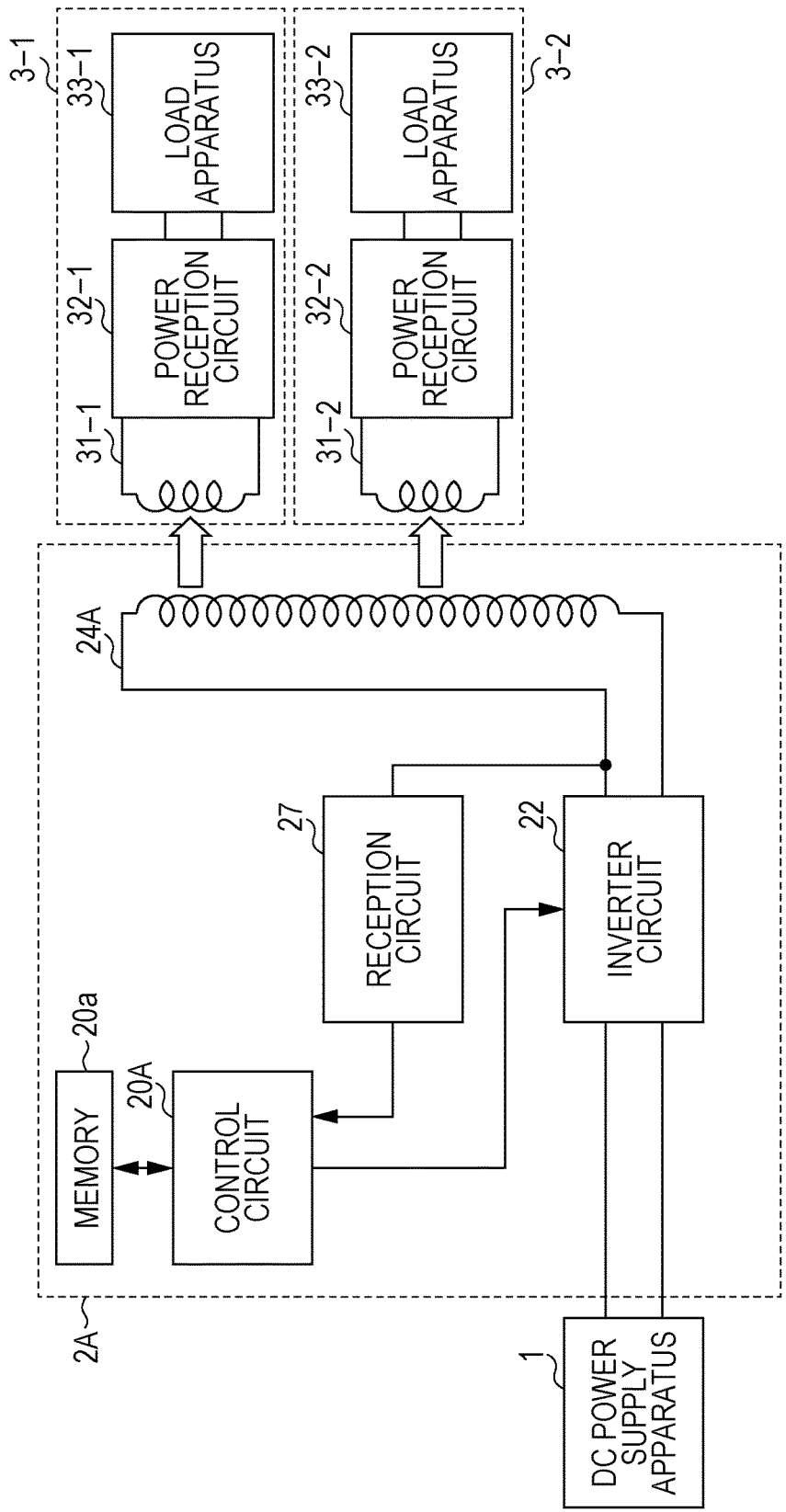
FIG. 19 is a block diagram illustrating a configuration of the wireless power transmission system according to a second modification of the first embodiment.

FIG. 19 is a block diagram illustrating a configuration of the wireless power transmission system according to a second modification of the first embodiment. The wireless power transmission apparatus according to the present modification may not include the DC-DC converter circuit 21. The wireless power transmission apparatus 2C illustrated in FIG. 19 is configured such that the DC-DC converter circuit 21 included in the wireless power transmission apparatus 2A illustrated in FIG. 10 is omitted, and a control circuit 20C and a transmission antenna 24C are disposed instead of the control circuit 20A and the transmission antenna 24A in FIG. 10. The control circuit 20C controls the frequency and the magnitude of high-frequency power generated by the inverter circuit 22. The control circuit 20C may control the amplitude (magnitude) of the high-frequency power by controlling at least one of the phase of the high-frequency power generated by the inverter circuit 22 and the duty ratio of the inverter circuit 22. The transmission antenna 24C may be similar in configuration to the transmission antenna 24A.

As described above, the wireless power transmission apparatus 2 needs to control the power transmission such that in a case where electric power is supplied simultaneously to a plurality of wireless power reception apparatuses 3-1 and 3-2, the circuit elements of any of the wireless power reception apparatuses 3-1 and 3-2 do not encounter with a voltage greater than the upper limited. To meet this requirement, the control circuit 20 of the wireless power transmission apparatus 2 executes a power transmission control process illustrated in FIG. 11.

Figure 11:
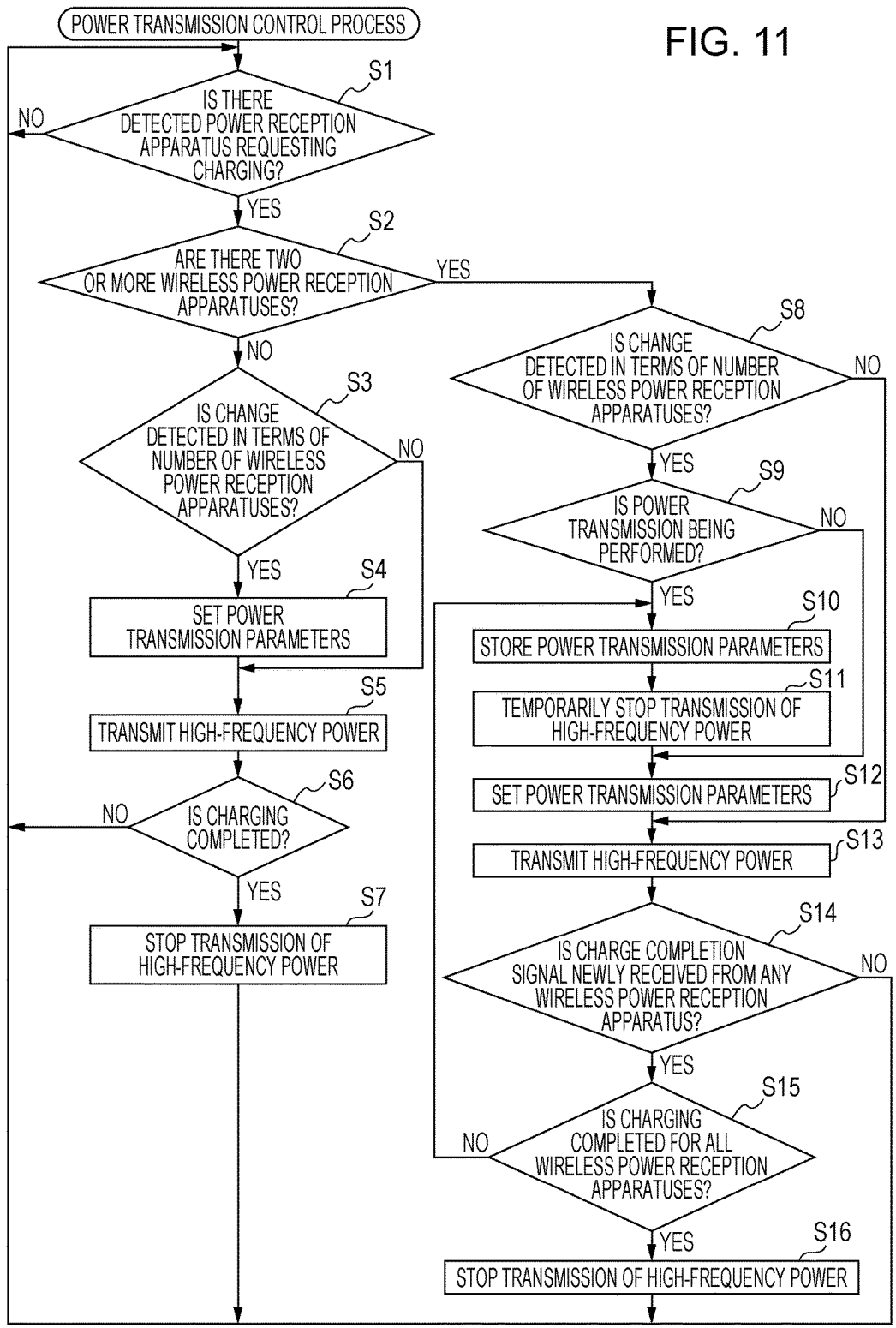
FIG. 11 is a flow chart illustrating a power transmission control process executed by a control circuit 20 in a wireless power transmission apparatus 2 in FIG. 1.

FIG. 11 is a flow chart illustrating the power transmission control process executed by the control circuit 20 of the wireless power transmission apparatus 2 in FIG. 1. In the following description, it is assumed that the load apparatuses 33-1 and 33-2 of the wireless power reception apparatuses 3-1 and 3-2 are each a rechargeable battery. In step S1, the control circuit 20 determines whether a wireless power reception apparatus is detected by the position detection coil 25 and the position detection circuit 26 and further determines based on information acquired via communication with the wireless power reception apparatus whether charging is requested by the wireless power reception apparatus. In a case where a wireless power reception apparatus requesting charging is detected, the processing flow proceeds to step S2, but otherwise the processing flow repeats step S1. In step S2, the control circuit 20 determines whether there are a plurality of wireless power reception apparatuses that are requesting being charged. In a case where the result of the determination is YES, the processing flow proceeds to step S8, but when the result is NO, the processing flow proceeds to step S3.

In step S3 in FIG. 11, the control circuit 20 determines whether a change has been detected, in the detection ins step S1, in terms of the number of wireless power reception apparatuses requesting being charged with respective to the previous number. In a case where the result of the determination is YES, the processing flow proceeds to step S4, but when the result is NO, the processing flow proceeds to step S5.

In step S4, the control circuit 20 sets parameters (power transmission parameters) associated with the operation state of the inverter circuit 22, wherein the parameters include the output voltage, the output current, and the operating frequency of the inverter circuit 22. The memory 20*a* stores in advance frequency characteristics of the output voltage of the reception antenna of each wireless power reception apparatus in a state in which high-frequency power is supplied to the wireless power reception apparatus. For existing wireless power reception apparatuses, the frequency characteristic of the output voltage of the reception antenna of each wireless power reception apparatus is stored in advance in the memory 20*a* when the wireless power transmission apparatus 2 is produced or before use of the wireless power transmission apparatus 2 is started. For a new wireless power reception apparatus emerging after the production of the wireless power transmission apparatus 2, the control circuit 20 may adaptively find a frequency characteristic of the output voltage of the reception antenna of the new wireless power reception apparatus (more specifically, an optimum value may be found by changing the frequency or the magnitude of the high-frequency power) or may acquire the frequency characteristic by another method and may store the frequency characteristic in the memory 20*a*. Once the frequency characteristic for the wireless power reception apparatus is stored in the memory 20*a*, it is allowed to use the frequency characteristic when the same wireless power reception apparatus is put later. Based on the frequency characteristic stored in the memory 20*a* and information (on the state of the load apparatus or the like) acquired via communication with the wireless power reception apparatus, the control circuit 20 sets the frequency and the magnitude of the high-frequency power generated by the inverter circuit 22 such that the output voltage of the reception antenna of the wireless power reception apparatus is less a predetermined threshold value.

The control circuit 20 sets the amplitude (magnitude) of the high-frequency power by controlling at least one of the following: the phase of the high-frequency power generated by the inverter circuit 22; the duty ratio of the inverter circuit 22; and the voltage of the DC electric power generated by the DC-DC converter circuit 21. That is, both the DC-DC converter circuit 21 and the inverter circuit 22 may be used to control the amplitude (magnitude) of the high-frequency power.

Alternatively, the amplitude (magnitude) of the high-frequency power may be controlled using only the inverter circuit 22 without using the DC-DC converter circuit 21. In this case, the control circuit 20 in FIG. 1, the control circuit 20A in FIG. 10, or the control circuit 20C in FIG. 19 is used to control at least one of the phase of the high-frequency power generated by the inverter circuit 22 and the duty ratio of the inverter circuit 22 to set the amplitude (magnitude) of the high-frequency power.

By setting the amplitude (magnitude) of the high-frequency power in step S4, it is possible to temporarily stop the transmission of the high-frequency power (with the amplitude set to 0) or temporarily reduce the amplitude (magnitude) of the high-frequency power being transmitted to a level lower than the amplitude (magnitude) as of when the new wireless power reception apparatus is detected to be coupled with the transmission antenna. In this case, it is possible to reduce the output voltage of each wireless power reception apparatus.

In step S5, the control circuit 20 generates high-frequency power using the inverter circuit 22 according to the condition set in step S4 and transmits the high-frequency power over a predetermined period. However, in a case where the answer to step S3 is NO, then, in step S5, the control circuit 20 continues the operation of generating high-frequency power using the inverter circuit 22 according to the previously-set condition and transmitting the high-frequency power. When charging is completed for a wireless power reception apparatus, the wireless power reception apparatus transmits a charge completion signal using a load modulation signal indicating the completion of the charging to the wireless power transmission apparatus 2. In step S6, the control circuit 20 determines whether a charge completion signal from a wireless power reception apparatus is received or not (whether charging of a rechargeable battery is completed or not). In a case where the result of the determination is YES, the processing flow proceeds to step S7, but when the result is NO, the processing flow returns to step S1. In step S7, the control circuit 20 stops the transmission of the high-frequency power. The processing flow then returns to step S1.

In step S8 in FIG. 11, the control circuit 20 determines whether a change has occurred in terms of the number of wireless power reception apparatuses requesting being charged. In a case where the result of the determination is YES, the processing flow proceeds to step S9, but when the result is NO, the processing flow proceeds to step S13. Note that when the answer to step S8 is YEA, this indicates that when high-frequency power is being transmitted to at least one wireless power reception apparatus (for example, the wireless power reception apparatus 3-1) of a plurality of wireless power reception apparatuses, it is detected that another wireless power reception apparatus (for example, the wireless power reception apparatus 3-2) of the plurality of wireless power reception apparatuses is newly electromagnetically coupled with the transmission antenna. In step S9, the control circuit 20 determines whether high-frequency power is being transmitted to an existing wireless power reception apparatus (for example, the wireless power reception apparatus 3-1). In a case where the result of the determination is YES, the processing flow proceeds to step S10, but when the result is NO, the processing flow proceeds to step S12. In step S10, the control circuit 20 stores parameters (power transmission parameters) associated with the operation state of the inverter circuit in the memory 20a. In step S11, the control circuit 20 temporarily stops the transmission of the high-frequency power.

In step S12, based on the power transmission parameters stored in the memory 20a and information (on the state of the load apparatus or the like) acquired via communication with the wireless power reception apparatus, the control circuit 20 resets the power transmission parameters (in particular in terms of the frequency and the amplitude of the high-frequency power to be simultaneously transmitted to the wireless power reception apparatuses 3-1 and 3-2). The memory 20a stores in advance frequency characteristics of the output voltage of the reception antennas 31-1 and 31-2 of the respective wireless power reception apparatuses 3-1 and 3-2 in a state in the which high-frequency power is supplied simultaneously to the wireless power reception apparatuses 3-1 and 3-2. The control circuit 20 further refers to the frequency characteristics stored in the memory 20a and sets the frequency and the magnitude of the high-frequency power generated by the inverter circuit 22 and transmitted simultaneously to the wireless power reception apparatuses 3-1 and 3-2 such that the output voltage of each of the reception antennas 31-1 and 31-2 is less than a predetermined threshold value.

In step S13, high-frequency power is generated by the inverter circuit 22 according to the condition set in step S12 and transmitted over a predetermined period. However, in a case where the answer to step S8 is NO, then, in step S13, the control circuit 20 continues the operation of generating high-frequency power using the inverter circuit 22 according to the previously-set condition and transmitting the high-frequency power. When charging is completed for a wireless power reception apparatus, the wireless power reception apparatus transmits a charge completion signal using a load modulation signal indicating the completion of the charging to the wireless power transmission apparatus 2. In step S14, a determination is performed as to whether a charge completion signal from any wireless power reception apparatus is received or not (that is, a change occurs in terms of the number of wireless power reception apparatuses receiving the supply of electric power). In a case where the result of the determination is YES, the processing flow proceeds to step S15, but when the result is NO, the processing flow returns to step S1. In step S15, the control circuit 20 determines whether charging of a rechargeable battery is completed for all wireless power reception apparatuses. In a case where the result of the determination is YES, the processing flow proceeds to step S16, but when the result is NO, the processing flow returns to step S10. In step S16, The control circuit 20 stops the transmission of the high-frequency power. The processing flow then returns to step S1.

Note that the control circuit 20A of the wireless power transmission apparatus 2A in FIG. 10 and the control circuit 20C of the wireless power transmission apparatus 2C in FIG. 19 are also capable of executing the power transmission control process in FIG. 11.

In the power transmission control process described above with reference to FIG. 11, the wireless power transmission apparatus 2 sets the frequency and the magnitude of the high-frequency power generated by the inverter circuit 22 based on the previously stored frequency characteristic of the output voltage of each of the reception antennas 31-1 and 31-2 in the state in which high-frequency power is transmitted simultaneously to the wireless power reception apparatuses 3-1 and 3-2, and based on parameters associated with the operation of the inverter circuit 22 of the wireless power transmission apparatus 2 in the state before the new wireless power reception apparatus 3-2 is put on the wireless power transmission apparatus 2 such that the output voltage of each of the reception antennas 31-1 and 31-2 is less than the predetermined threshold value.

Figure 12:
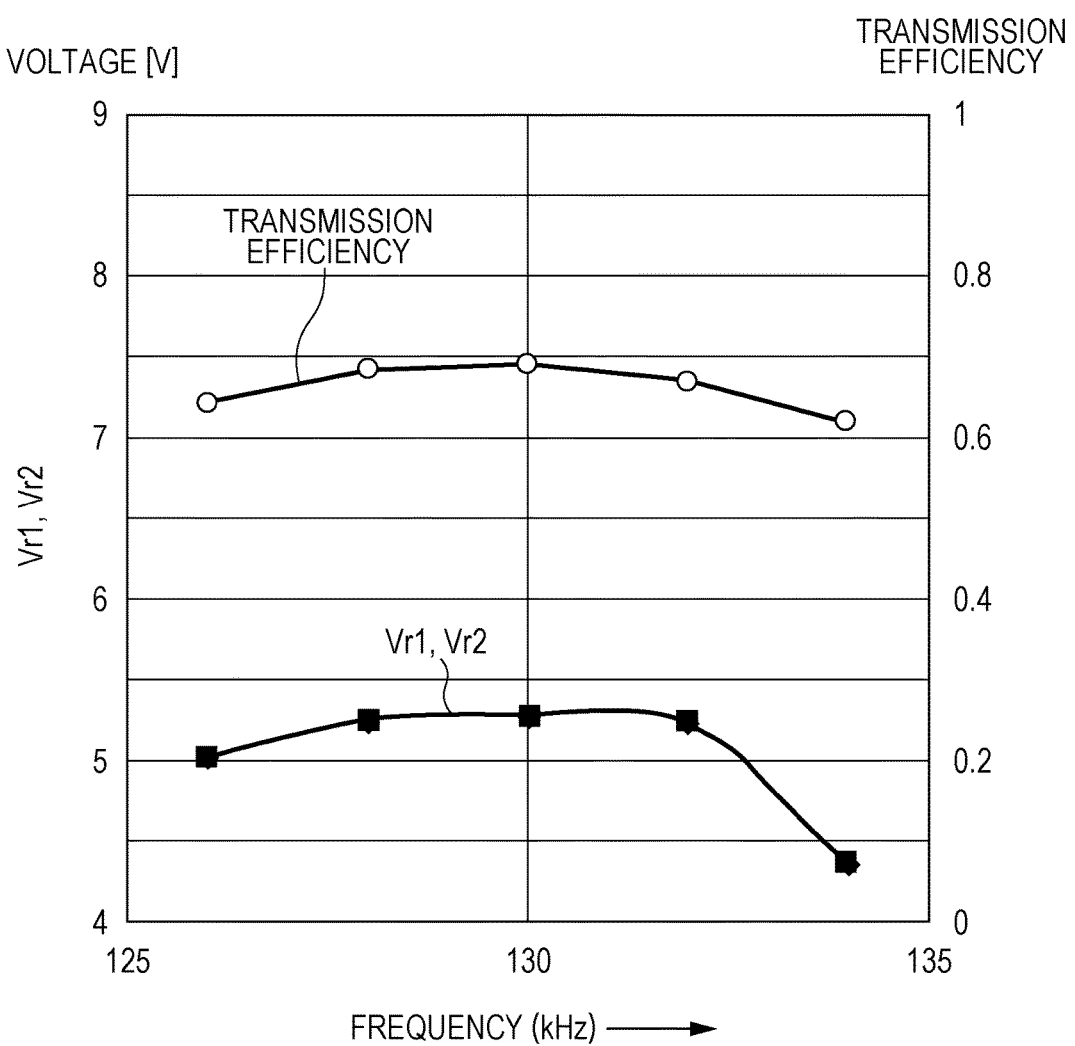
FIG. 12 is a graph illustrating output voltages Vr1 and Vr2 at respective reception antennas 31-1 and 31-2 and transmission efficiency of a wireless power transmission system for a case in which wireless power reception apparatuses 3-1 and 3-2 in FIG. 1 have equal load impedance.
Figure 13:
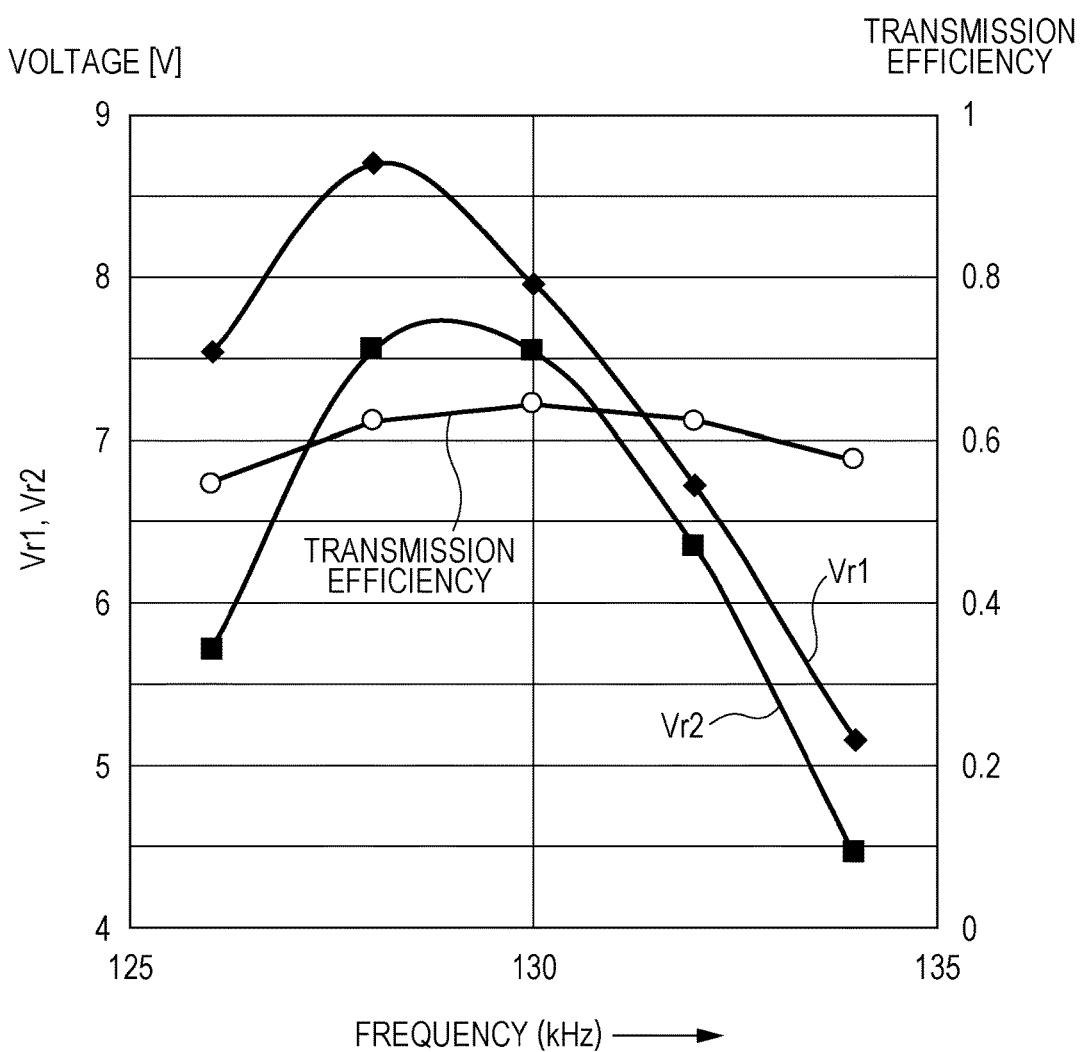
FIG. 13 is a graph illustrating output voltages Vr1 and Vr2 at respective reception antennas 31-1 and 31-2 and transmission efficiency of the wireless power transmission system for a case in which wireless power reception apparatuses 3-1 and 3-2 in FIG. 1 have different load impedance.

FIG. 12 is a graph illustrating output voltages Vr1 and Vr2 at the respective reception antennas 31-1 and 31-2 and transmission efficiency of the wireless power transmission system for a case in which the wireless power reception apparatuses 3-1 and 3-2 in FIG. 1 have equal load impedance. FIG. 13 is a graph illustrating output voltages Vr1 and Vr2 at the respective reception antennas 31-1 and 31-2 and transmission efficiency of the wireless power transmission system for a case in which the wireless power reception apparatuses 3-1 and 3-2 in FIG. 1 have different load impedance. In the example in FIG. 13, the wireless power reception apparatus 3-2 has a load impedance that is five times greater than that of the wireless power reception apparatus 3-1. In this case, depending on the frequency, there is a possibility that the output voltage Vr1 of the reception antenna 31-1 can be very high compared with the output voltage Vr2 of the reception antenna 31-2, and the output voltage Vr1 of the reception antenna 31-1 can be higher than the upper limit of the voltage allowed for the circuit elements of the wireless power reception apparatus 3-2.

That is, the output voltage of the wireless power reception apparatus 3-1 can change when the reception antenna of the wireless power reception apparatus 3-2 is electromagnetically coupled with the transmission antenna of the wireless power transmission apparatus 2. In this example, the output voltage of the wireless power reception apparatus 3-1 increases. Therefore, by detecting a change in an output voltage of any wireless power reception apparatus receiving the supply of power from one wireless power transmission apparatus 2, it is possible to detect an occurrence of electromagnetic coupling of a new wireless power reception apparatus with the transmission antenna.

To prevent the output voltages of the reception antennas 31-1 and 31-2 from increasing beyond the upper limit of the voltage of circuit elements of the wireless power reception apparatuses 3-1 and 3-2 in the state in which power is supplied simultaneously to the plurality of wireless power reception apparatuses 3-1 and 3-2 from one wireless power transmission apparatus 2, it is necessary to reduce the difference in output voltage between the reception antennas 31-1 and 31-2. As can be seen from FIG. 13, even when there is a difference in load impedance, there can be a frequency band in which the difference becomes small in output voltage between the reception antennas 31-1 and 31-2. In view of the above, the control circuit 20 of the wireless power transmission apparatus 2 sets the frequency of the high-frequency power generated by the inverter circuit 22 so as to achieve a small difference in output voltage between the reception antenna 31-1 and 31-2. In the case illustrated in FIG. 13, it is possible to prevent the output voltages of the reception antennas 31-1 and 31-2 from becoming greater than the upper limit of the voltage for the circuit element of the respective wireless power reception apparatuses 3-1 and 3-2 by setting the frequency of the high-frequency power generated by the inverter circuit 22 to a value in a high range (for example, in a range from 130 to 134 kHz (note that when the frequency is set to be too high, a reduction in transmission efficiency occurs) or setting the voltage of the DC electric power generated by the DC-DC converter circuit 21 to a low value.

In the setting of the frequency of the high-frequency power generated by the inverter circuit 22, the frequency may be gradually reduced from a high value to find an optimum frequency. In the setting of the voltage of DC electric power generated by the DC-DC converter circuit 21, the voltage may be gradually increased from a low value to find an optimum voltage.

Second Embodiment

A wireless power transmission system according to a second embodiment of the present disclosure is described below with reference to drawings.

Figure 14:
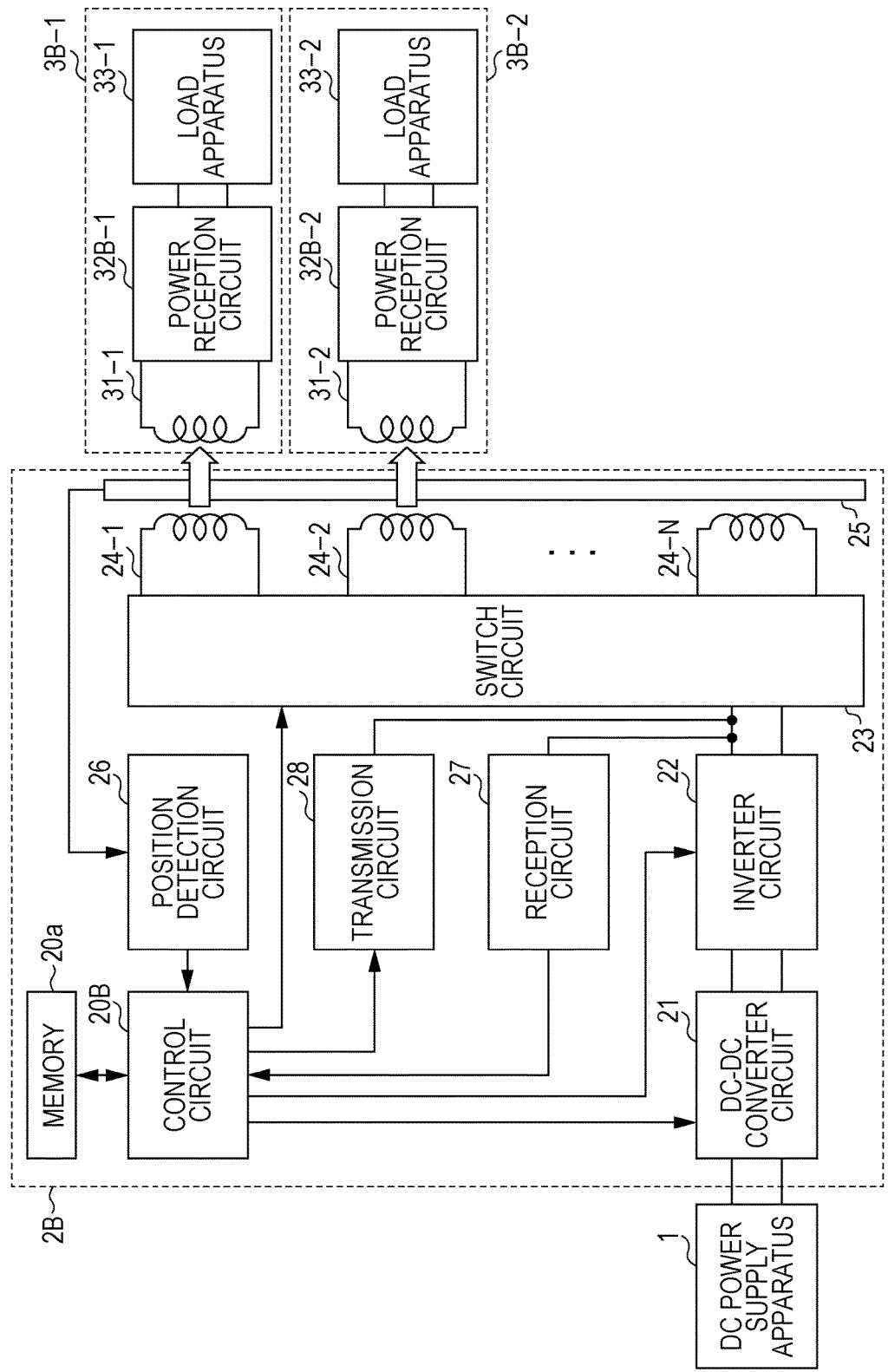
FIG. 14 is a block diagram illustrating a configuration of the wireless power transmission system according to the second embodiment.

FIG. 14 is a block diagram illustrating a configuration of the wireless power transmission system according to the second embodiment. The wireless power transmission system illustrated in FIG. 1 includes a wireless power transmission apparatus 2B connected to a DC power supply 1 and a plurality of wireless power reception apparatuses 3B-1 and 3B-2 which receive electric power from the wireless power transmission apparatus 2B.

The wireless power transmission apparatus 2B illustrated in FIG. 14 further includes a transmission circuit 28 in addition to elements in the configuration of the wireless power transmission apparatus 2 illustrated in FIG. 1, and includes a control circuit 20B instead of the control circuit 20 illustrated in FIG. 1. The control circuit 20B determines a time slot that is common for the wireless power transmission apparatus 2B and the plurality of wireless power reception apparatuses 3B-1 and 3B-2 and generates a timing signal indicating the time slot. The transmission circuit 28 transmits a control signal including the timing signal to the wireless power reception apparatuses 3B-1 and 3B-2 via the transmission antennas 24-1 to 24-N.

The wireless power reception apparatus 3B-1 illustrated in FIG. 14 includes a power reception circuit 32B-1 instead of the power reception circuit 32-1 of the wireless power reception apparatus 3-1 illustrated in FIG. 1.

Figure 15:
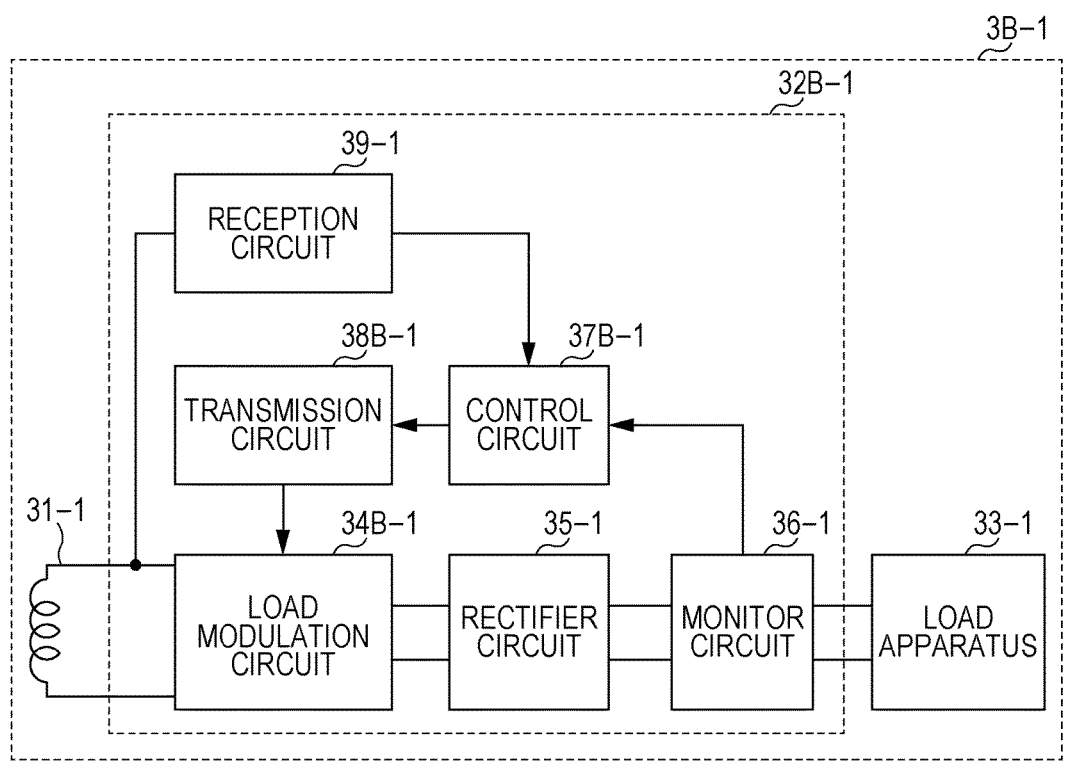
FIG. 15 is a block diagram illustrating an example of a detailed configuration of a wireless power reception apparatus 3B-1 in FIG. 14.

FIG. 15 is a block diagram illustrating an example of a detailed configuration of the wireless power reception apparatus 3B-1 in FIG. 14. The power reception circuit 32B-1 in FIG. 15 further includes a receiving circuit 39-1 in addition to elements of the configuration of the power reception circuit 32-1 illustrated in FIG. 2, and furthermore includes a load modulation circuit 34B-1, a control circuit 37B-1, and a transmission circuit 38B-1 instead of the load modulation circuit 34-1, the control circuit 37-1, and the transmission circuit 38-1, respectively, illustrated in FIG. 2. The receiving circuit 39-1 receives, via the reception antenna 31-1, a control signal transmitted from the wireless power transmission apparatus 2B. The load modulation circuit 34B-1 is connected to the reception antenna 31-1 and performs a load modulation by changing power consumption of the wireless power reception apparatus 3B-1 at a first frequency f1 (for example, 2 kHz) or at a second frequency f2 (for example, 5 kHz) higher than the first frequency f1. The transmission circuit 38B-1 generates either a first load modulation signal with the first frequency f1 or a second load modulation signal with the second frequency f2 by using the load modulation circuit 34B-1 under the control of the control circuit 37B-1. In accordance with a notification signal from the monitor circuit 36-1 and the control signal received by the receiving circuit 39-1, the control circuit 37B-1 controls the transmission circuit 38B-1 to generate either the first load modulation signal or the second load modulation signal.

Figure 16:
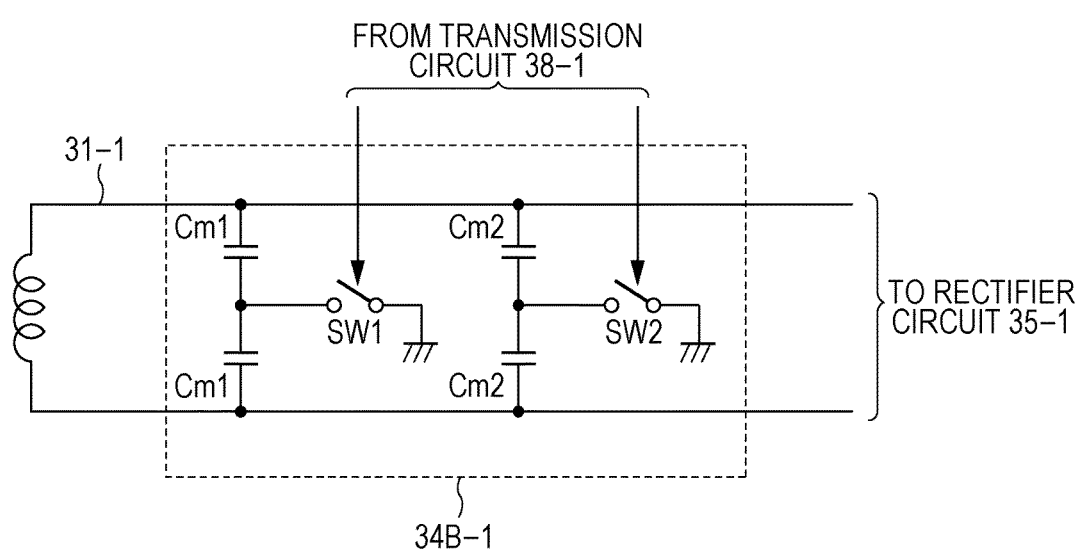
FIG. 16 is a circuit diagram illustrating an example of a detailed configuration of a load modulation circuit 34B-1 in FIG. 15.

FIG. 16 is a circuit diagram illustrating an example of a detailed configuration of the load modulation circuit 34B-1 in FIG. 15. The load modulation circuit 34B-1 includes a first circuit part including two capacitors each having capacitance Cm1 and a switch SW1, and a second circuit part including two capacitors each having capacitance Cm2 and a switch SW2. In the first circuit part, the two capacitors are connected in series to each other and the series of two capacitors is connected in parallel to the power reception coil of the reception antenna 31-1, and the switch SW1 is connected to the node between the two capacitors such that the node between the two capacitors is selectively grounded under the control of the transmission circuit 38B-1. In the second circuit part, the two capacitors are connected in series to each other and the series of two capacitors is connected in parallel to the power reception coil of the reception antenna 31-1, and the switch SW2 is connected to the node between the two capacitors such that the node between the two capacitors is selectively grounded under the control of the transmission circuit 38B-1. The capacitance Cm1 and Cm2 of the respective capacitors are sufficiently small (for example, about 100 pF) so that the capacitance Cm1 and Cm2 do not cause a change to occur in the frequency (for example, a frequency in a 100 kHz band) of a carrier wave of a data signal transmitted from the transmission circuit 38B-1.

When the carrier wave is modulated by a high frequency, it is possible to achieve a high data transmission rate (it is possible to transmit a large amount of data per unit time). However, power per bit becomes small (power per unit amount of information becomes small). This results in a reduction in signal-to-noise power ratio (SNR), which may cause communication to become unstable and thus there occurs a possibility that demodulation of data fails. To handle the above-described situation, in the load modulation circuit 34B-1, the modulation depth (ratio of change in the amplitude modulation) of the second load modulation signal is set to be greater than the modulation depth of the first load modulation signal. In this case, the capacitance Cm2 is set to be greater than the capacitance Cm1. By setting the modulation depths in the above-described manner, it becomes possible to increase the stability in the transmission of data. Furthermore, the stability of the transmission is improved also in a case where the electromagnetic coupling between the transmission antennas 24-1 to 24-N and the reception antenna 31-1 is weak.

The wireless power reception apparatus 3B-2 in FIG. 14 may be similar in configuration to the wireless power reception apparatus 3B-1. By employing the above-described configuration for the wireless power reception apparatuses 3B-1 and 3B-2, it becomes possible for the wireless power reception apparatuses 3B-1 and 3B-2 to operate such that when the plurality of wireless power reception apparatuses 3B-1 and 3B-2 communicate with the wireless power transmission apparatus 2B using load modulation signals, the plurality of wireless power reception apparatuses 3B-1 and 3B-2 are allowed to communicate, at the same time, with the wireless power transmission apparatus 2B using load modulation signals with different frequencies (for example, the wireless power reception apparatus 3B-1 uses a frequency f1 and the wireless power reception apparatus 3B-2 uses a frequency f2).

Figure 17:
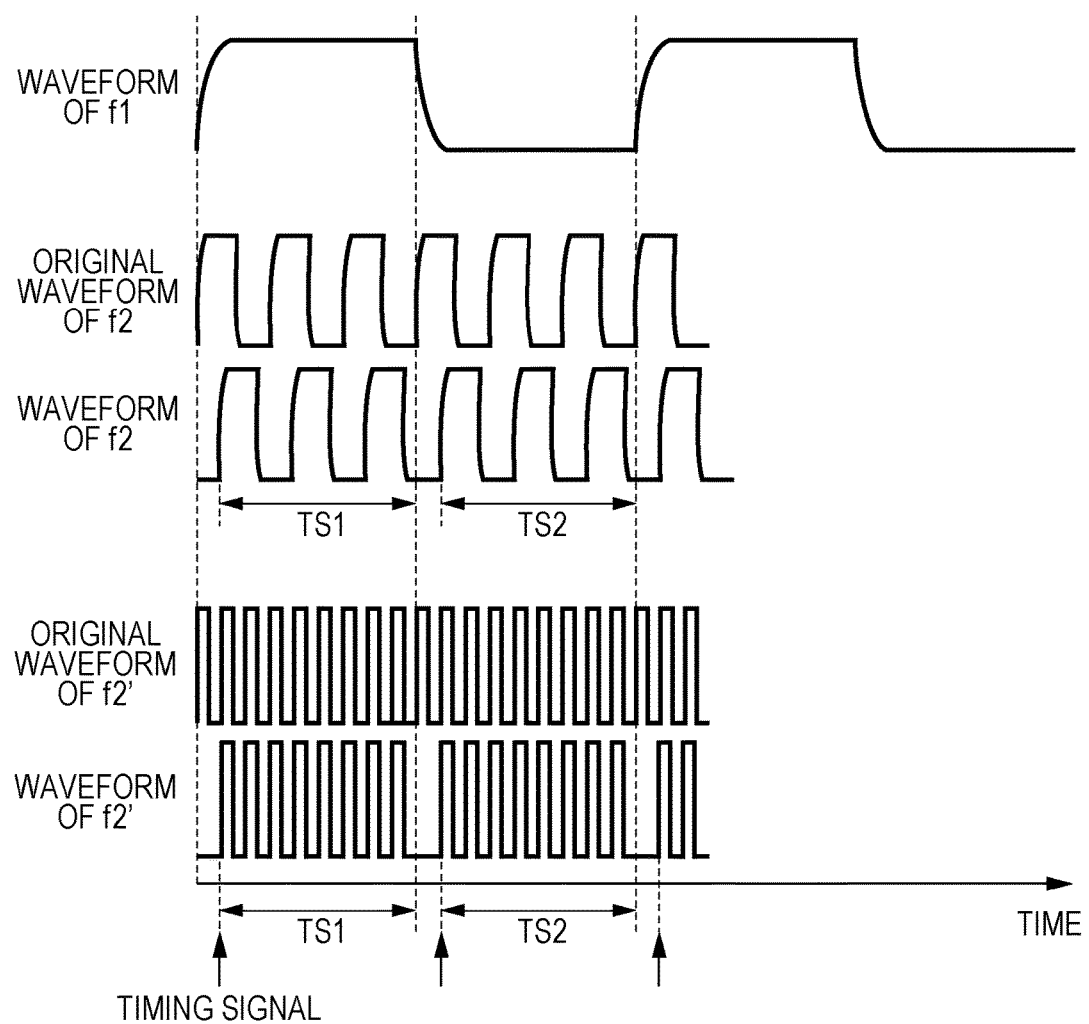
FIG. 17 is a timing chart associated with load modulation signals generated by the load modulation circuit 34B-1 in FIG. 15.

FIG. 17 is a timing chart associated with load modulation signals generated by the load modulation circuit 34B-1 in FIG. 15. As described above, the control circuit 20B of the wireless power transmission apparatus 2B determines time slots that are common for the wireless power transmission apparatus 2B and the plurality of wireless power reception apparatuses 3B-1 and 3B-2. For example, in a case where the wireless power reception apparatus 3B-1 communicated with the wireless power transmission apparatus 2B using a first load modulation signal (illustrated in a first row as counted from the top in FIG. 17) with a frequency of f1, and the wireless power reception apparatus 3B-2 communicated with the wireless power transmission apparatus 2B using a second load modulation signal (illustrated in a second row as counted from the top in FIG. 17) with a frequency of f2, if rising edges or falling edges occur at the same time in different load modulation signals, there is a possibility that a communication error occurs. To handle this situation, the control circuit 20B of the wireless power transmission apparatus 2B transmits control signals to the wireless power reception apparatuses 3B-1 and 3B-2 to control waveforms of the first and second load modulation signals to have rising edges and falling edges in each time slot such that timings of the rising and falling edges are different between the first and second load modulation signals. In response to the control signals, the control circuit of either the wireless power reception apparatus 3B-1 or wireless power reception apparatus 3B-2 controls the transmission circuit 38B-1 such that a delaying offset is given to either the first or second load modulation signals (illustrated in a third row as counted from the top in FIG. 17).

The process of giving the delaying offset is performed, for example, as described below in detail for a case where the delaying offset is given to the load modulation signal with the frequency f2 (wireless power reception apparatus 3B-2). In a case where the wireless power reception apparatus 3B-1 (frequency f1) is put first on the wireless power transmission apparatus 2 and then the wireless power reception apparatus 3B-2 (frequency f2) is put on the wireless power transmission apparatus 2, the wireless power transmission apparatus 2 has already gotten to know the timing of transmitting the first load modulation signal (frequency f1). Therefore, in this case, the wireless power transmission apparatus 2 transmits a timing signal with a delaying offset to the wireless power reception apparatus 3-2 to cause the second load modulation signal (frequency f2) to be delayed in timing of transmission thereof. On the other hand, in a case where the wireless power reception apparatus 3B-2 is first put on the wireless power transmission apparatus 2 and then the wireless power reception apparatus 3B-1 is put on the wireless power transmission apparatus 2, the wireless power transmission apparatus 2 receives the first load modulation signal and detects the timing of transmitting the first load modulation signal. Thereafter, the wireless power transmission apparatus 2 transmits a timing signal with a delaying offset to the wireless power reception apparatus 3B-2. In this case, the wireless power transmission apparatus 2 may transmit repeatedly to the wireless power reception apparatus 3B-2 over a period in which the wireless power reception apparatus 3B-2 is on the wireless power transmission apparatus 2 and when a first load modulation signal is received, the wireless power transmission apparatus 2 may transmit the timing signal with the delaying offset to the wireless power reception apparatus 3B-2. This ensures that communication between the wireless power transmission apparatus 2 and the wireless power reception apparatus 3B-2 is surely achieved. Even in the state in which the wireless power reception apparatus 3B-2 is on the wireless power transmission apparatus 2, the wireless power transmission apparatus 2 may not transmit the timing signal to the wireless power reception apparatus 3B-2 until the wireless power reception apparatus 3B-1 is put on the wireless power transmission apparatus 2. This results in a reduction in power consumption. Note that the manner of giving the delaying offset is not limited to the example described above. For example, a delaying offset may be given to the load modulation signal with the frequency f1 (wireless power reception apparatus 3B-1). Alternatively, a delaying offset may be given to a load modulation signal generated by a wireless power reception apparatus that is put later than another wireless power reception apparatus or to a load modulation signal generated by a wireless power reception apparatus detected by the wireless power transmission apparatus 2 later than another wireless power reception apparatus. Furthermore, although the number of frequencies is assumed to be two in the example described above, the number of frequencies is not limited two. For example, also in a case where two or more frequencies are used for load modulation signals, it is possible to achieve communication from a plurality of wireless power reception apparatuses by giving different offsets such that any rising edge and any falling edge is different in occurrence timing as in the above-described example.

To achieve different timings of rising and falling edges between waveforms of the first and second load modulation signals in each time slot, a change in the second load modulation signal may be prohibited at any rising or falling edge of the first load modulation signal (illustrated in a fifth row in FIG. 17) instead of giving the delaying offset to either the first or second load modulation signal.

When a plurality of wireless power reception apparatuses 3B-1 and 3B-2 communicate with the wireless power transmission apparatus 2B using load modulation signals, the second load modulation signal may be time-sharing multiplexed to achieve simultaneous communication. In a case where a plurality of wireless power reception apparatuses 3B-1 to 3B-2 communicate with the wireless power transmission apparatus 2B using time-shared load modulation signal, the control circuit 20B of the wireless power transmission apparatus 2B assign different time slots to the respective wireless power reception apparatuses 3B-1 and 3B-2. The control circuit 20B of the wireless power transmission apparatus 2B transmits control signals indicating the assigned time slots to the respective wireless power reception apparatuses 3B-1 and 3B-2. The control circuits of the wireless power reception apparatuses 3B-1 and 3B-2 control their transmission circuits such that the second load modulation signal is generated in the time slots assigned by the control circuit 20B of the wireless power transmission apparatus 2B.

In a case where the plurality of wireless power reception apparatuses include a conventional wireless power reception apparatus that does not support the time-sharing communication, the conventional wireless power reception apparatus is allowed to perform communication using the first load modulation signal without using the time-sharing communication.

Figure 18:
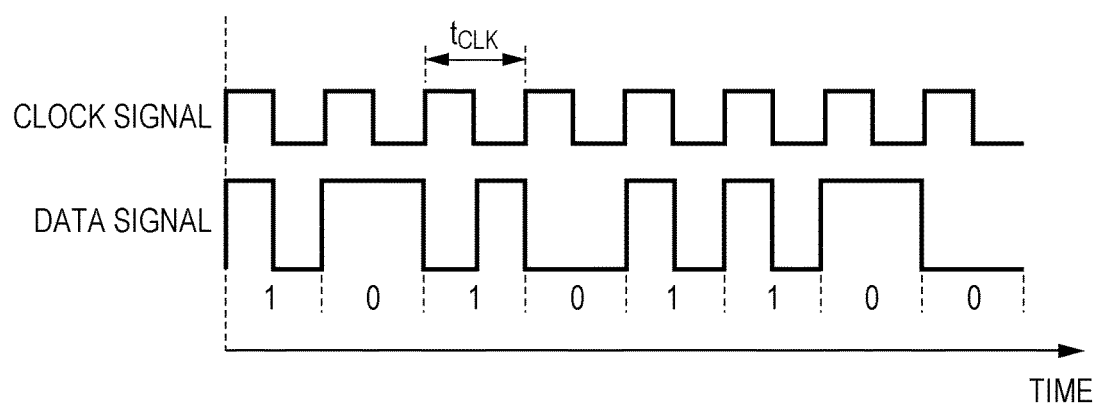
FIG. 18 is a timing chart illustrating by way of example codes of a load modulation signal used in a wireless power transmission system in FIG. 14.

FIG. 18 is a timing chart illustrating by way of example codes of a load modulation signal used in the wireless power transmission system in FIG. 14. In FIG. 18, it is assumed by way of example that the load modulation signal is coded generated according to a Wireless Power Consortium standard. A clock signal with a frequency of 2 kHz is used. In the wireless power transmission system according to the second embodiment, it is possible to transmit data with no error even in the case where the plurality of wireless power reception apparatuses 3B-1 and 3B-2 simultaneously communicate with the wireless power transmission apparatus 2B using the load modulation signals.

FIG. 20 is a block diagram illustrating a configuration of the wireless power transmission system according to a modification of the second embodiment. Also in this modification, the wireless power transmission apparatus may not include the DC-DC converter circuit 21. More specifically, the wireless power transmission apparatus 2D illustrated in FIG. 20 may be configured such that the DC-DC converter circuit 21 included in the wireless power transmission apparatus 2B illustrated in FIG. 14 is omitted, and a control circuit 20D is provided instead of the control circuit 20B in FIG. 14. The control circuit 20D controls the frequency and the magnitude of high-frequency power generated by the inverter circuit 22. The control circuit 20D may control the amplitude (magnitude) of the high-frequency power by controlling at least one of the phase of the high-frequency power generated by the inverter circuit 22 and the duty ratio of the inverter circuit 22.

The wireless power transmission system according to the second embodiment provides benefits described below.

The wireless power transmission apparatus determines the timings of rising and falling edges of the load modulation signal such that the first and second load modulation signals do not change at the same time in the receiving circuit of the wireless power transmission apparatus. This make it possible to easily and surely demodulate the load modulation signals using a simple circuit, and thus a reduction in error rate in the demodulation is achieved.

In a case where a high priority is placed on a low error rate, each time slot may have a time period in which signal transition is prohibited (however, this results in a reduction in communication speed).

By including the frequency of modulating the second load modulation signal used in the time-sharing communication, it is possible to set the time-shared second load modulation signal to have a modulation rate per time slot higher than the modulation rate per time slot for the first load modulation signal.

The load modulation signals may be frequency-division multiplexed to achieve an increase in communication speed. In this case, the wireless power reception apparatus may determine the timings of the rising and falling edges of the load modulation signal.

The control circuit 20B of the wireless power transmission apparatus 2B in FIG. 14 or the control circuit 20D of the wireless power transmission apparatus 2D in FIG. 20 executes the power transmission control process in FIG. 11 sets the frequency and the magnitude of the high-frequency power generated by the inverter circuit 22 such that the output voltages of the reception antennas 31-1 and 31-2 are less a predetermined threshold value.

In this case, the control circuit 20B may control the amplitude (magnitude) of the high-frequency power by controlling at least one of the phase of the high-frequency power generated by the inverter circuit 22, the duty ratio of the inverter circuit 22, and the voltage of the DC electric power generated by the DC-DC converter circuit 21. That is, both the DC-DC converter circuit 21 and the inverter circuit 22 may be used to control the amplitude (magnitude) of the high-frequency power.

Alternatively, to control the amplitude (magnitude) of the high-frequency power, only the inverter circuit 22 may be used without using the DC-DC converter circuit 21. In this case, the control circuit 20B in FIG. 14 or the control circuit 20D in FIG. 20 may control the amplitude (magnitude) of the high-frequency power by controlling at least one of the phase of the high-frequency power generated by the inverter circuit 22 and the duty ratio of the inverter circuit 22.

By setting the amplitude (magnitude) of the high-frequency power in step S4 in FIG. 11, it is possible to temporarily stop the transmission of the high-frequency power (with the amplitude set to 0) or temporarily reduce the amplitude (magnitude) of the high-frequency power being transmitted to a level lower than the amplitude (magnitude) as of when the new wireless power reception apparatus is detected to be coupled with the transmission antenna. In this case, it is possible to reduce the output voltage of each wireless power reception apparatus.

Note that the embodiments disclosed above are merely for illustrative, not limitation, purposes. The scope of the present disclosure is not limited by the embodiments described above but is limited only by the appended claims. Note that various equivalent embodiments and modifications are possible without departing from the spirit and the scope of the invention.

Note that also in a case where the wireless power transmission system includes three or more wireless power reception apparatuses, the wireless power transmission system is capable of operating in a similar manner to the embodiments described above.

The wireless power transmission apparatus and the wireless power transmission system according to the present disclosure may be applied to various apparatuses and systems such as an electronic device using a rechargeable battery, a charging system for an electric motorcycle, a power-assisted bicycle, an electric automobile, and the like. The wireless power transmission apparatus and the wireless power transmission system according to the present disclosure are also applicable to an electric power supply system for supplying power to various devices such as a AV device, while goods, and the like. Examples of AV devices include a smartphone, a tablet terminal apparatus, a television set, and a laptop personal computer. Examples of white gods include a washing machine, a refrigerator, and an air-conditioner.

What is claimed is:

1. A wireless power transmission apparatus comprising:
at least one transmission antenna that is capable of being electromagnetically coupled with reception antennas included in each of a plurality of wireless power reception apparatuses, each of the reception antennas including a power reception coil, which transmits high-frequency power to the plurality of wireless power reception apparatuses;
an inverter circuit that generates the high-frequency power and supplies the generated high-frequency power to the at least one transmission antenna;
a receiving circuit that receives a voltage value of each power reception coil from each of the plurality of wireless power reception apparatuses;
a control circuit that controls a transmission condition including a frequency or an amplitude of the high-frequency power supplied from the inverter circuit, depending on the received voltage value,
wherein in a case that the at least one transmission antenna is transmitting the high-frequency power to at least a first wireless power reception apparatus, and the control circuit detects that at least a second wireless power reception apparatus is additionally electromagnetically coupled with the at least one transmission antenna,
the control circuit changes one of the frequency or the amplitude of the high-frequency power depending on the voltage value received from each of at least the first and second wireless power reception apparatuses, to regulate the voltage value of each power reception coil included in each of at least the first and second wireless power reception apparatuses to be equal to or lower than an upper limit value of the voltage value, circuit elements included in each of the first and second wireless power reception apparatuses being durable for the upper limit value,
wherein the control circuit regulates the voltage value of each power reception coil included in each of at least the first and second wireless power reception apparatuses to be equal to or smaller than the upper limit value of the voltage value and to be equal to or greater than a minimum limit value of the voltage value, circuit elements included in each of the first and second wireless power reception apparatuses being operable above the minimum limit value,
wherein in the case that the control circuit detects that at least the second wireless power reception apparatus is additionally electromagnetically coupled with the at least one transmission antenna, the control circuit changes the frequency of the high-frequency power to regulate a difference among the voltage values of each power reception coil included in each of at least the first and second wireless power reception apparatuses, within a voltage range corresponding to a difference between the upper limit value of the voltage and the minimum limit value, and wherein the control circuit changes the amplitude of the high-frequency power, in a state in which the changed frequency of the high-frequency power is maintained at the changed frequency, to regulate the voltage value of each power reception coil included in each of at least the first and second wireless power reception apparatuses to be equal to or smaller than the upper limit value and equal to or greater than minimum limit value.

2. The wireless power transmission apparatus according to claim 1, wherein the change of one of the frequency or the amplitude of the high-frequency power comprises a stop or a reduction of one of the frequency or the amplitude of the high-frequency power.

3. The wireless power transmission apparatus according to claim 1, further comprising: a position detection coil; and a position detection circuit that, in a case that the position detection circuit detects that at least the second wireless power reception apparatus is additionally electromagnetically coupled with the at least one transmission antenna, and using the position detection coil, detects a relative position of the reception antenna included in at least the second wireless power reception apparatus with respect to the transmission antenna, or detects change of the voltage value received from at least the second wireless power reception apparatuses.

4. The wireless power transmission apparatus according to claim 1, further comprising a storage apparatus which in advance stores data regarding frequency characteristics of the voltage values corresponding to at least the first and second wireless power reception apparatuses, wherein in a case that the control circuit detects that at least the second wireless power reception apparatus is additionally electromagnetically coupled with the at least one transmission antenna, the control circuit determines the frequency and the amplitude of the high-frequency power transmitted to the first and second wireless power reception apparatuses, based on the frequency characteristics stored in the storage.

5. A wireless power transmission system comprising:
the wireless power transmission apparatus according to claim 1; and
a plurality of wireless power reception apparatuses each including a reception antenna having a resonance circuit including a power reception coil.

* * * * *